(12) United States Patent
Miyoshi et al.

(10) Patent No.: US 12,712,990 B2
(45) Date of Patent: Aug. 18, 2026

(54) PROJECTOR, METHOD FOR CONTROLLING PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventors: Kazuhiro Miyoshi, Matsumoto (JP); Masataka Miyamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/618,491

(22) Filed: Mar. 27, 2024

(65) Prior Publication Data

US 2024/0333897 A1 Oct. 3, 2024

(30) Foreign Application Priority Data

Mar. 29, 2023 (JP) ................................ 2023-052985

(51) Int. Cl.
*H04N 9/31* (2006.01)

(52) U.S. Cl.
CPC ................................ *H04N 9/3188* (2013.01)

(58) Field of Classification Search
CPC .................................................... H04N 9/3188
See application file for complete search history.

(56) References Cited

U.S. PATENT DOCUMENTS

2013/0083167 A1* 4/2013 Miyauchi ................ H04N 5/74 348/46

FOREIGN PATENT DOCUMENTS

JP 2015-161833 A 9/2015
JP 2015-163930 A 9/2015

* cited by examiner

*Primary Examiner* — Yassin Alata
(74) *Attorney, Agent, or Firm* — Dority & Manning, P.A.

(57) ABSTRACT

A projector includes: an optical device configured to emit image light indicating an image; a processing device; and a housing accommodating the optical device and the processing device, in which the processing device displays, on a projection surface using the optical device, a first image for selecting one method of a plurality of methods for determining a size of the image on the projection surface, the plurality of methods including a first method and a second method, displays, on the projection surface using the optical device when the first method is selected, a second image whose length is to be measured, and displays, on the projection surface using the optical device when the second method is selected, a third image whose width is changeable.

15 Claims, 21 Drawing Sheets

SC
PG
R1
VH
R2
+Y
+Z
+X
PW
Y
11
PL
10
PH

10
PROJECTOR
70
MEMORY
CP
CONTROL PROGRAM
71
OSD DATA
13
OPERATION PANEL
15
OPERATION BUTTON
60
CONTROLLER
61
OSD CONTROLLER
63
DATA PROCESSOR
65
IMAGE CONTROLLER
30
IMAGE PROJECTION DEVICE
80
COMMUNICATION INTERFACE
90
RECEIVER
SC
200
REMOTE CONTROL

FIG. 7

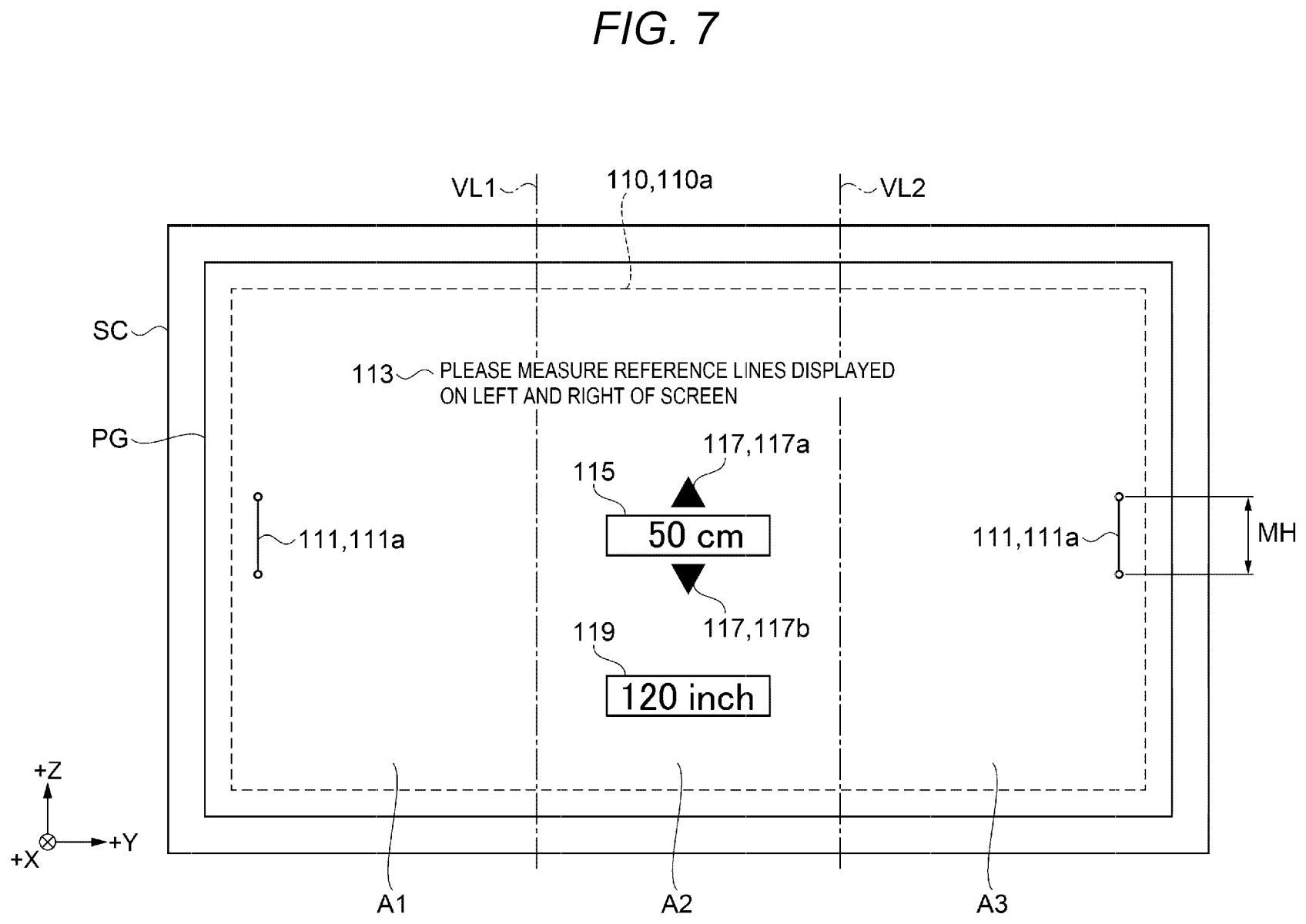

MH
111,111a
A3
VL2
PLEASE MEASURE REFERENCE LINES DISPLAYED
ON LEFT AND RIGHT OF SCREEN
117,117a
117,117b
110,110a
50 cm
120 inch
115
119
A2
VL1
113
111,111a
A1
SC
PG
+Y
+Z
+X

PLEASE MEASURE REFERENCE LINES DISPLAYED
ON LEFT AND RIGHT OF SCREEN 50 cm 120 inch

Figure 10:
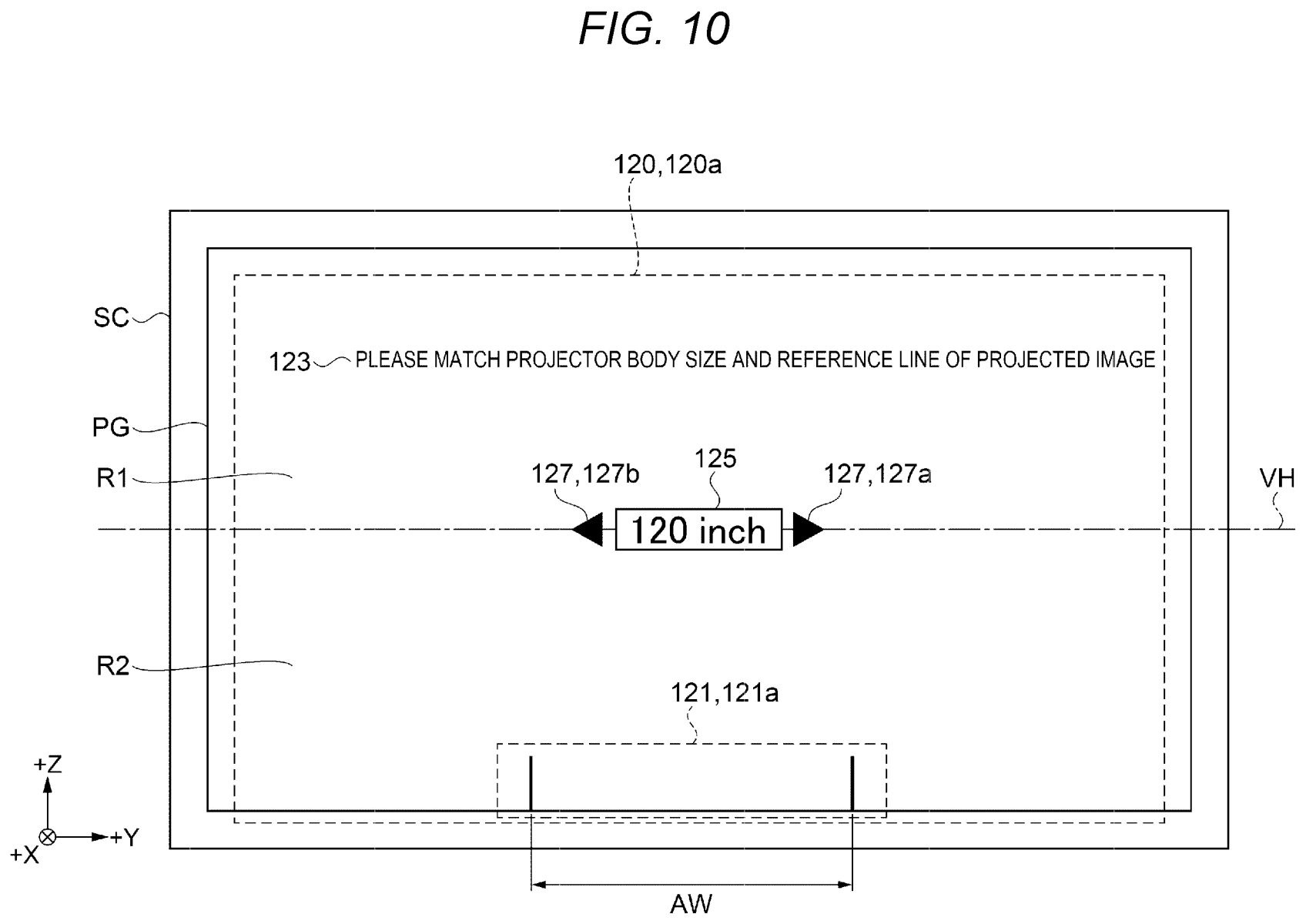

VH
120,120a
PLEASE MATCH PROJECTOR BODY SIZE AND REFERENCE LINE OF PROJECTED IMAGE
123
127,127a
125
120 inch
127,127b
121,121a
AW
SC
PG
R1
R2
+Y
+Z
+X VH
AW
121,121a
PLEASE MATCH PROJECTOR BODY SIZE AND REFERENCE LINE OF PROJECTED IMAGE
127,127a
125
120 inch
127,127b
120,120b
123
SC
PG
R1
R2
+Y
+Z
+X

A MEASURE REFERENCE LINES DISPLAYED ON LEFT AND RIGHT OF SCREEN 50 cm

B MATCH PROJECTOR BODY SIZE AND REFERENCE LINE OF PROJECTED IMAGE 120 inch

C MATCH ATTACHED REMOTE CONTROL AND REFERENCE LINE OF PROJECTED IMAGE 120 inch 103a 103c 101,101b 105a 105c 105 105b 107c 107 107b 107a 103 103b SC PG

Figure 16:
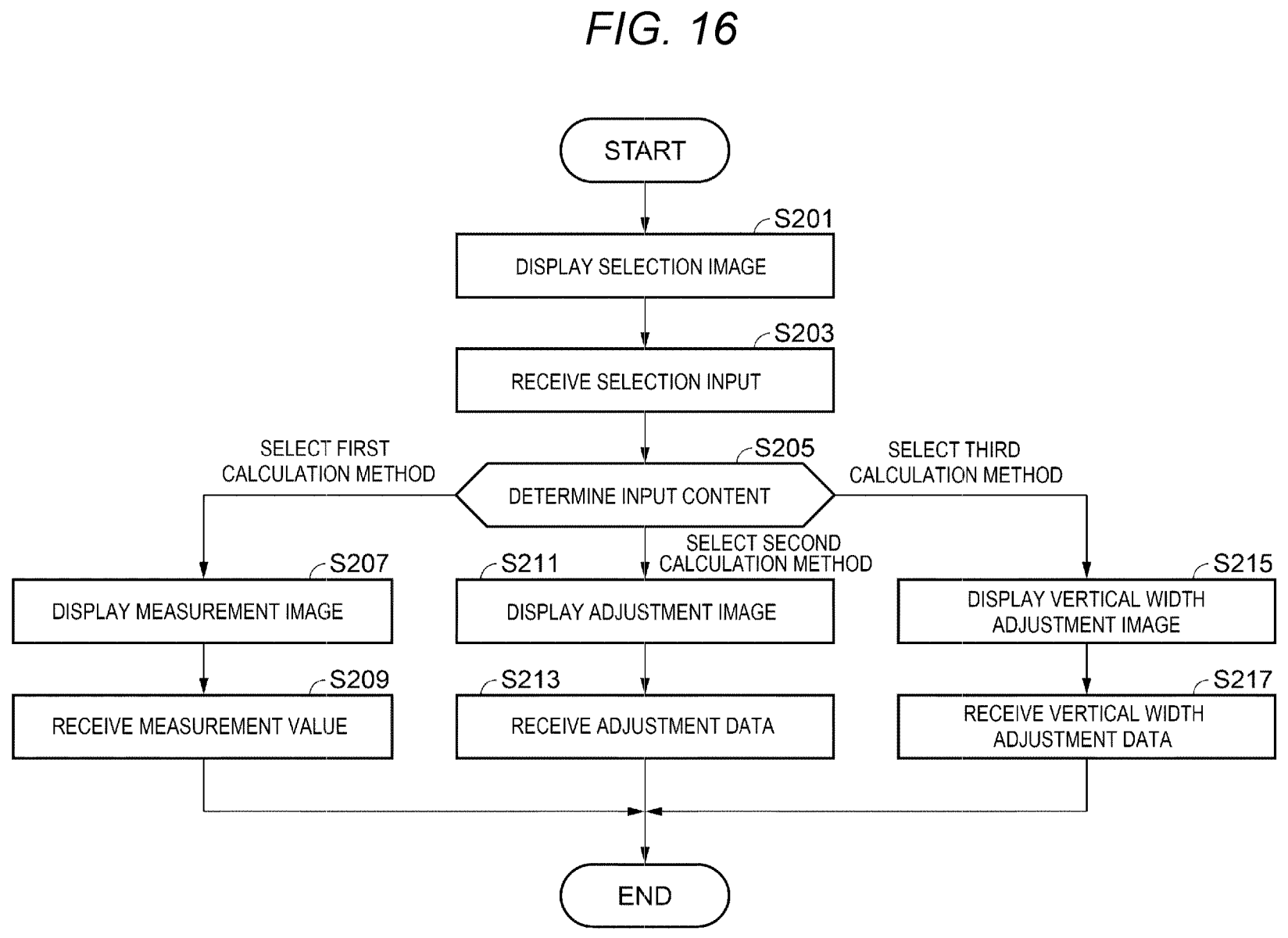

START

S201 DISPLAY SELECTION IMAGE

S203 RECEIVE SELECTION INPUT

S205 DETERMINE INPUT CONTENT

SELECT FIRST CALCULATION METHOD

SELECT SECOND CALCULATION METHOD

SELECT THIRD CALCULATION METHOD

S207 DISPLAY MEASUREMENT IMAGE

S209 RECEIVE MEASUREMENT VALUE

S211 DISPLAY ADJUSTMENT IMAGE

S213 RECEIVE ADJUSTMENT DATA

S215 DISPLAY VERTICAL WIDTH ADJUSTMENT IMAGE

S217 RECEIVE VERTICAL WIDTH ADJUSTMENT DATA

END

FIG. 17

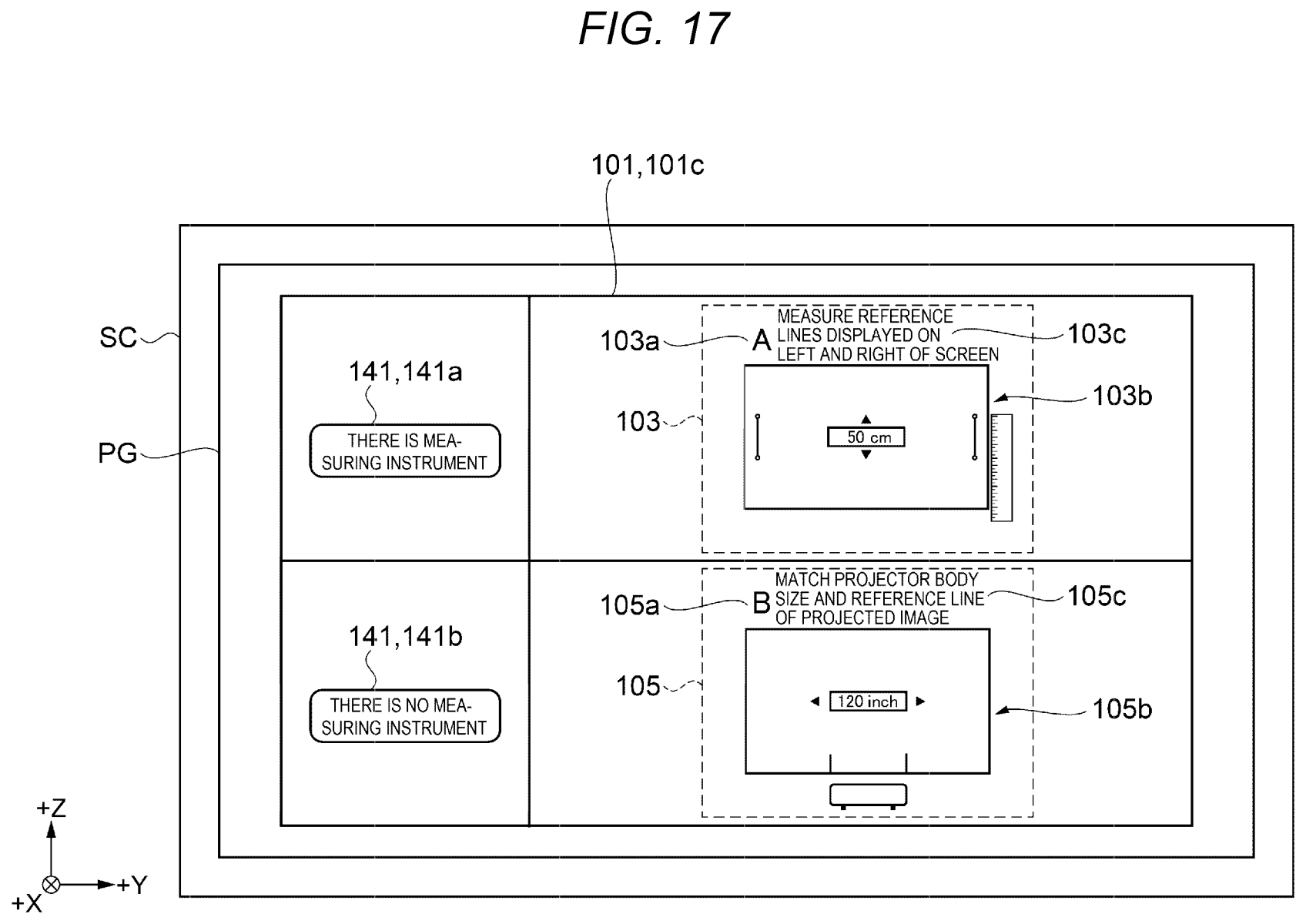

101,101c
103a
103
103c
103b
A MEASURE REFERENCE LINES DISPLAYED ON LEFT AND RIGHT OF SCREEN
50 cm
105a
105
105c
105b
B MATCH PROJECTOR BODY SIZE AND REFERENCE LINE OF PROJECTED IMAGE
120 inch
141,141a
THERE IS MEASURING INSTRUMENT
141,141b
THERE IS NO MEASURING INSTRUMENT
SC
PG
+Y
+Z
+X

FIG. 20

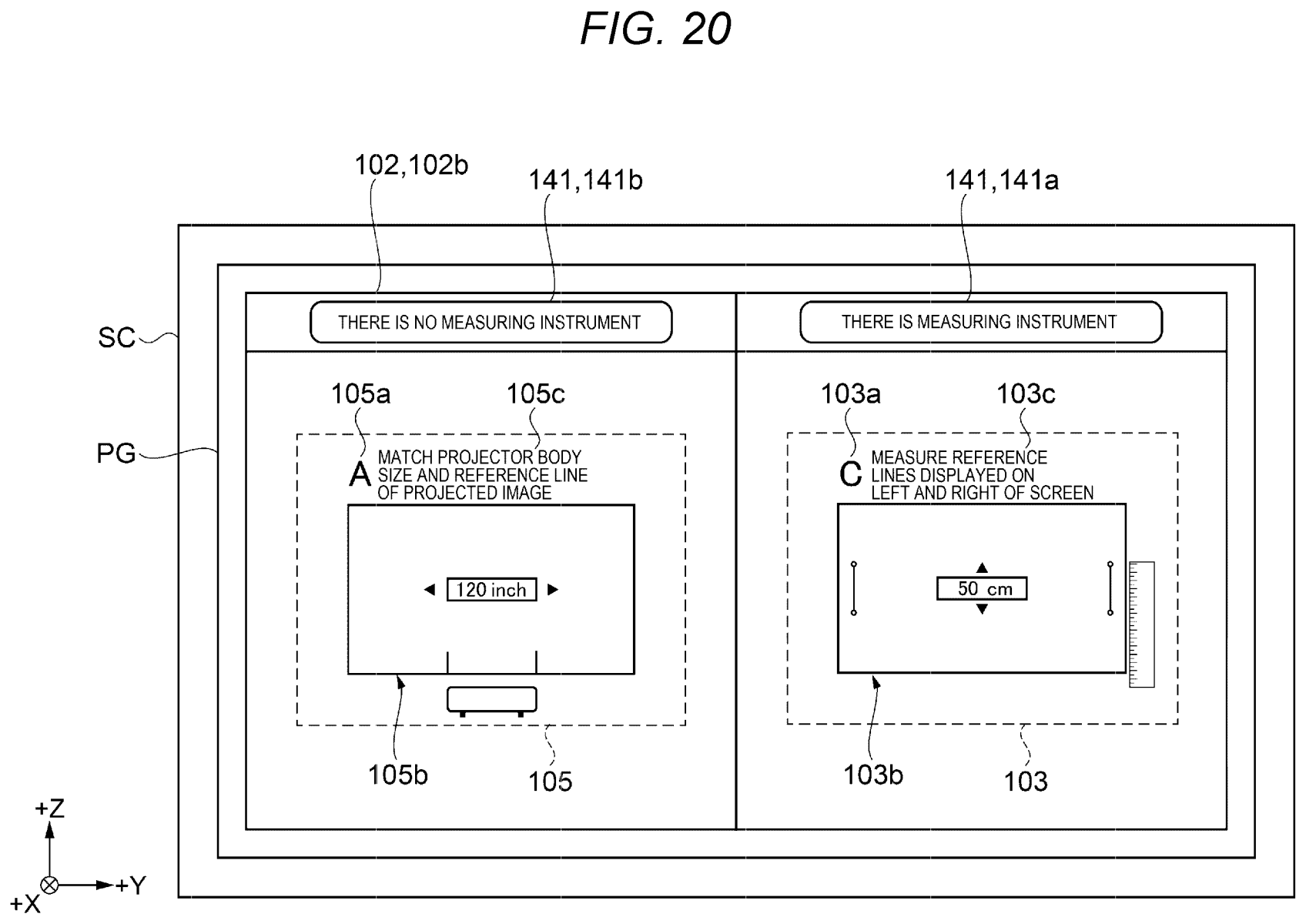

141,141a
THERE IS MEASURING INSTRUMENT
103c
103a
C
MEASURE REFERENCE LINES DISPLAYED ON LEFT AND RIGHT OF SCREEN
50 cm
103
103b 141,141b
102,102b
THERE IS NO MEASURING INSTRUMENT
105c
105a
A
MATCH PROJECTOR BODY SIZE AND REFERENCE LINE OF PROJECTED IMAGE
120 inch
105
105b

SC
PG
+Y
+Z
+X 141,141a
THERE IS MEASURING INSTRUMENT
103c
103a
C
MEASURE REFERENCE LINES DISPLAYED ON LEFT AND RIGHT OF SCREEN
50 cm
103
103b
102,102c
141,141b
THERE IS NO MEASURING INSTRUMENT
107c
107a
B
MATCH ATTACHED REMOTE CONTROL AND REFERENCE LINE OF PROJECTED IMAGE
120 inch
107
107b
SC
PG
+Y
+Z
+X

PROJECTOR, METHOD FOR CONTROLLING PROJECTOR, AND NON-TRANSITORY COMPUTER-READABLE STORAGE MEDIUM STORING PROGRAM

The present application is based on, and claims priority from JP Application Serial Number 2023-052985, filed Mar. 29, 2023, the disclosure of which is hereby incorporated by reference herein in its entirety.

BACKGROUND

1. Technical Field

The present disclosure relates to a projector, a method for controlling a projector, and a non-transitory computer-readable storage medium storing a program.

2. Related Art

A projector that measures a distance between a projection surface and a projector is known. By measuring the distance between the projection surface and the projector, a size of a projection screen on a screen is obtained. A projector disclosed in JP-A-2015-161833 includes a size display. In the size display, a projection size is described as a scale. A user uses a handle as the size display to set a position of a device body. The user can confirm a projection size of a projection screen by a scale provided on the handle.

JP-A-2015-161833 is an example of the related art.

When the distance between the projection surface and the projector is measured using the handle, a usage condition under which the projection size can be measured is limited.

SUMMARY

A projector according to the present disclosure includes: an optical device configured to emit image light indicating an image; a processing device; and a housing accommodating the optical device and the processing device, in which the processing device displays, on a projection surface using the optical device, a first image for selecting one method of a plurality of methods for determining a size of the image on the projection surface, the plurality of methods including a first method and a second method, displays, on the projection surface using the optical device when the first method is selected, a second image whose length is to be measured, and displays, on the projection surface using the optical device when the second method is selected, a third image whose width is changeable.

A method for controlling a projector according to the present disclosure includes: displaying, on a projection surface from the projector, a first image for selecting one method of a plurality of methods for determining a size of an image on the projection surface, the plurality of methods including a first method and a second method; displaying, on the projection surface from the projector when the first method is selected, a second image whose length is to be measured; and displaying, on the projection surface from the projector when the second method is selected, a third image whose width is changeable.

A non-transitory computer-readable storage medium storing a program according to the present disclosure is provided. The program causes a projector to display, on a projection surface, a first image for selecting one method of a plurality of methods for determining a size of an image on the projection surface, the plurality of methods including a first method and a second method; display, on the projection surface when the first method is selected, a second image whose length is to be measured; and display, on the projection surface when the second method is selected, a third image whose width is changeable.

BRIEF DESCRIPTION OF THE DRAWINGS

FIG. 7 is a diagram showing the projection image including a measurement image.

FIG. 8 is a diagram showing a state when a user measures a measurement target image.

FIG. 9 is a diagram showing the projection image including a measurement image.

FIG. 10 is a diagram showing the projection image including an adjustment image.

FIG. 13 is a diagram showing a control flow executed in the projector.

FIG. 14 is a diagram showing a projection image including a selection image.

FIG. 16 is a diagram showing a control flow executed in a projector.

FIG. 17 is a diagram showing a projection image including a selection image.

FIG. 20 is a diagram showing the projection image including a sub-selection image.

DESCRIPTION OF EMBODIMENTS

Figure 1:
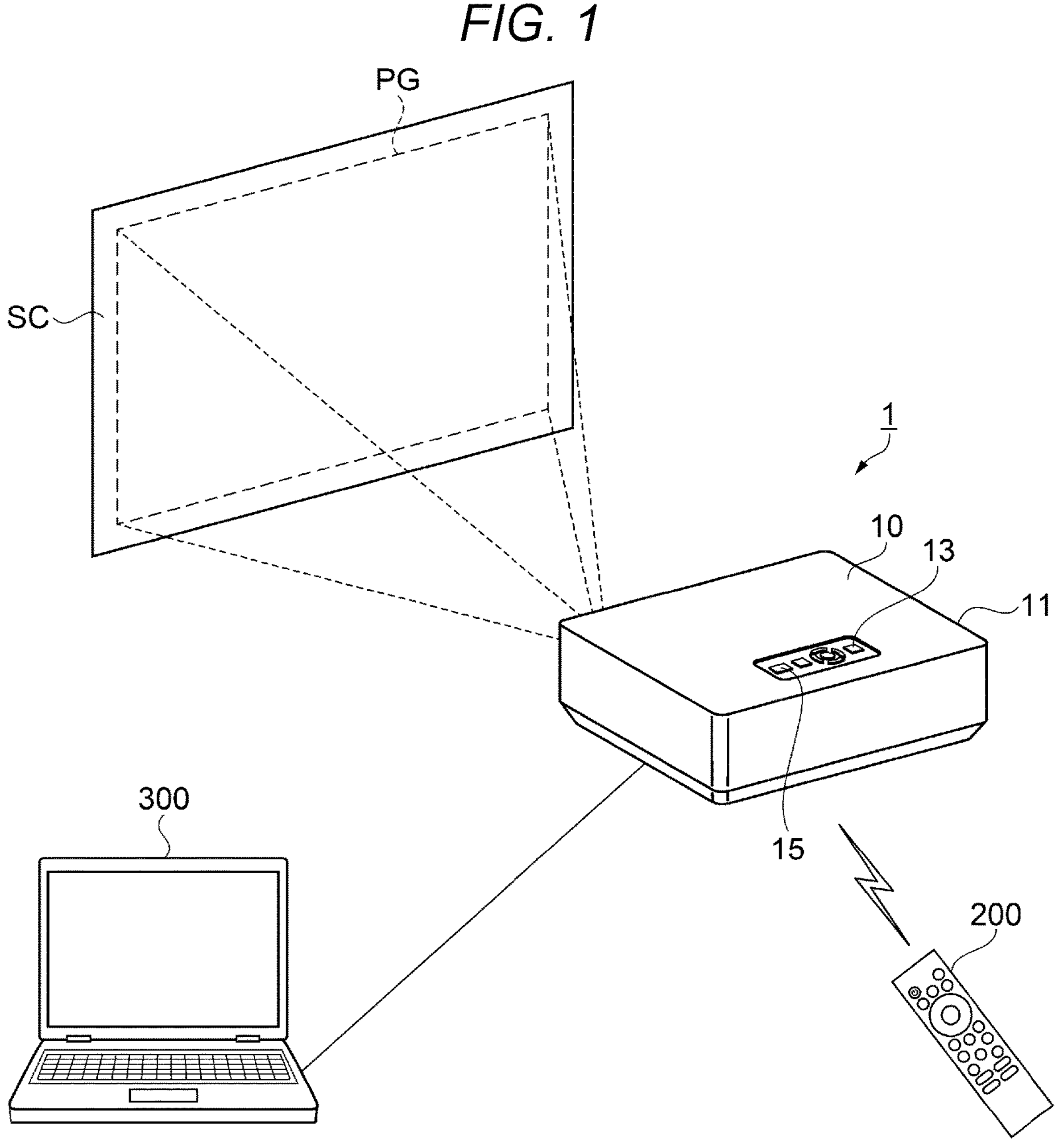
FIG. 1 is a diagram showing a schematic configuration of a projection system.

FIG. 1 shows a schematic configuration of a projection system 1. The projection system 1 includes a projector 10 and an image providing device 300. The projector 10 projects a projection image PG onto a projection surface SC. The projection image PG corresponds to an image. The projection system 1 shown in FIG. 1 includes one image providing device 300, but is not limited thereto. A plurality of image providing devices 300 may be coupled to the projector 10.

The projection surface SC displays the projection image PG projected from the projector 10. The projection surface SC shown in FIG. 1 is implemented by a screen, but is not limited thereto. The projection surface SC may be an indoor wall, a ceiling, an outer wall of a building, or the like. A projection surface shape of the projection surface SC is not limited to a flat surface, and may be a three-dimensional shape such as a curved surface, a surface having unevenness, or a spherical surface.

The projector 10 is disposed at a position where the projector 10 faces the projection surface SC. The projector 10 is communicably connected to the image providing device 300. The projector 10 may be communicably connected to a control device different from the image providing device 300. The projector 10 receives image data from the image providing device 300. The projector 10 projects the projection image PG onto the projection surface SC based on the image data. The projector 10 may project the projection image PG onto the projection surface SC based on display data stored therein. The projector 10 includes a case 11 and an operation panel 13.

The case 11 constitutes an exterior of the projector 10. The case 11 accommodates a controller 60, a memory 70, and the like. The case 11 accommodates at least a part of an image projection device 30. The image projection device 30, the controller 60, and the memory 70 will be described later. The case 11 corresponds to an example of a housing.

The operation panel 13 is operated by a user M. The user M performs various settings of the projector 10 by performing an input operation on the operation panel 13. The operation panel 13 includes a plurality of operation buttons 15. The projector 10 shown in FIG. 1 includes the operation panel 13, but is not limited thereto. The projector 10 may not include the operation panel 13.

The image providing device 300 is communicably connected to the projector 10. The image providing device 300 transmits image data to the projector 10. The image providing device 300 may have a function of adjusting an image shape of the projection image PG projected onto the projection surface SC by the projector 10. The image providing device 300 is a tablet terminal, a smartphone, a mobile computer, a desktop computer, or the like.

The projection system 1 may include a remote control 200. The remote control 200 is an abbreviation for remote controller. The remote control 200 is attached to the projector 10. The remote control 200 has an infrared line communication function or a Bluetooth communication function. Bluetooth is a registered trademark. The remote control 200 communicates with the projector 10. The remote control 200 has a plurality of buttons that allow for input operations. When the user M operates the button, the remote control 200 transmits an operation signal to the projector 10. The projector 10 receives the operation signal and operates based on the operation signal.

Figure 2:
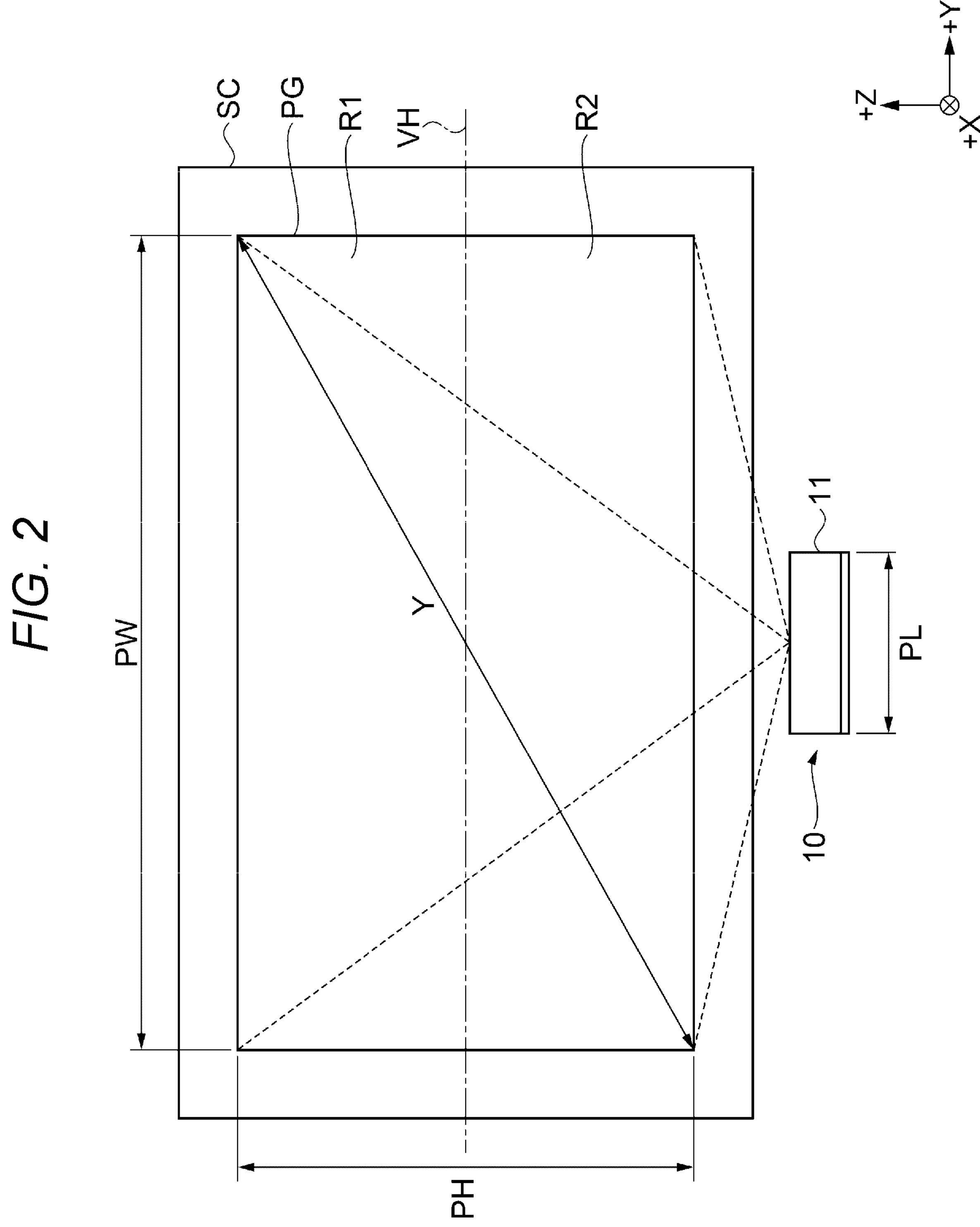
FIG. 2 is a diagram showing a schematic configuration of a projection image projected onto a projection surface.

FIG. 2 shows a schematic configuration of the projection image PG projected onto the projection surface SC. FIG. 2 shows the projection surface SC and the projector 10. FIG. 2 shows the projection image PG having an aspect ratio of a:b. The aspect ratio is a ratio between a long side and a short side of the projection image PG. a and b are integers representing the aspect ratio. The aspect ratio is, for example, 4:3, 16:9, or 16:10.

A plurality of drawings including FIG. 2 show an XYZ coordinate system. An X axis is an axis orthogonal to the projection surface SC. A +X direction is a direction from a front to a back toward the projection surface SC. A −X direction is a direction from the projection surface SC toward the front. A Y axis is an axis parallel to the long side of the projection image PG. A +Y direction is a direction from left to right toward the projection surface SC. A −Y direction is a direction from right to left toward the projection surface SC. A Z axis is an axis orthogonal to the Y axis in the projection surface SC, and is parallel to the short side of the projection image PG. A +Z direction is a +Z direction in a left-hand system. In the example in FIG. 2, when the projection image PG is a horizontally long image, the +Z direction is a direction from a lower side toward an upper side of the projection image PG. A −Z direction is a direction from the upper side toward the lower side in FIG. 2.

The projector 10 is disposed at a position where the projector 10 faces the projection surface SC. The projector 10 has a predetermined case width PL along the Y axis. The case width PL matches a width of the projector 10 along the Y axis. The case width PL corresponds to an example of a housing width.

A projection image width PW of the projection image PG shown in FIG. 2 is a length of the long side of the projection image PG projected onto the projection surface SC. The long side of the projection image PG is parallel or substantially parallel to the Y axis. A projection image height PH of the projection image PG shown in FIG. 2 is a length of the short side of the projection image PG projected onto the projection surface SC. The short side of the projection image PG is parallel or substantially parallel to the Z axis. The projection image PG projected onto the projection surface SC has rectangular shape. A diagonal line length Y is a length of a diagonal line of the projection image PG projected onto the projection surface SC. The projection image width PW, the projection image height PH, and the diagonal line length Y of the projection image PG projected onto the projection surface SC are examples of the length of the projection image PG projected onto the projection surface SC. FIG. 2 shows a virtual horizontal line VH. The virtual horizontal line VH is a virtual line parallel to the long side passing through a center of the projection image PG. A region above the virtual horizontal line VH is represented as a first region R1. A region below the virtual horizontal line VH is represented as a second region R2.

Figure 3:
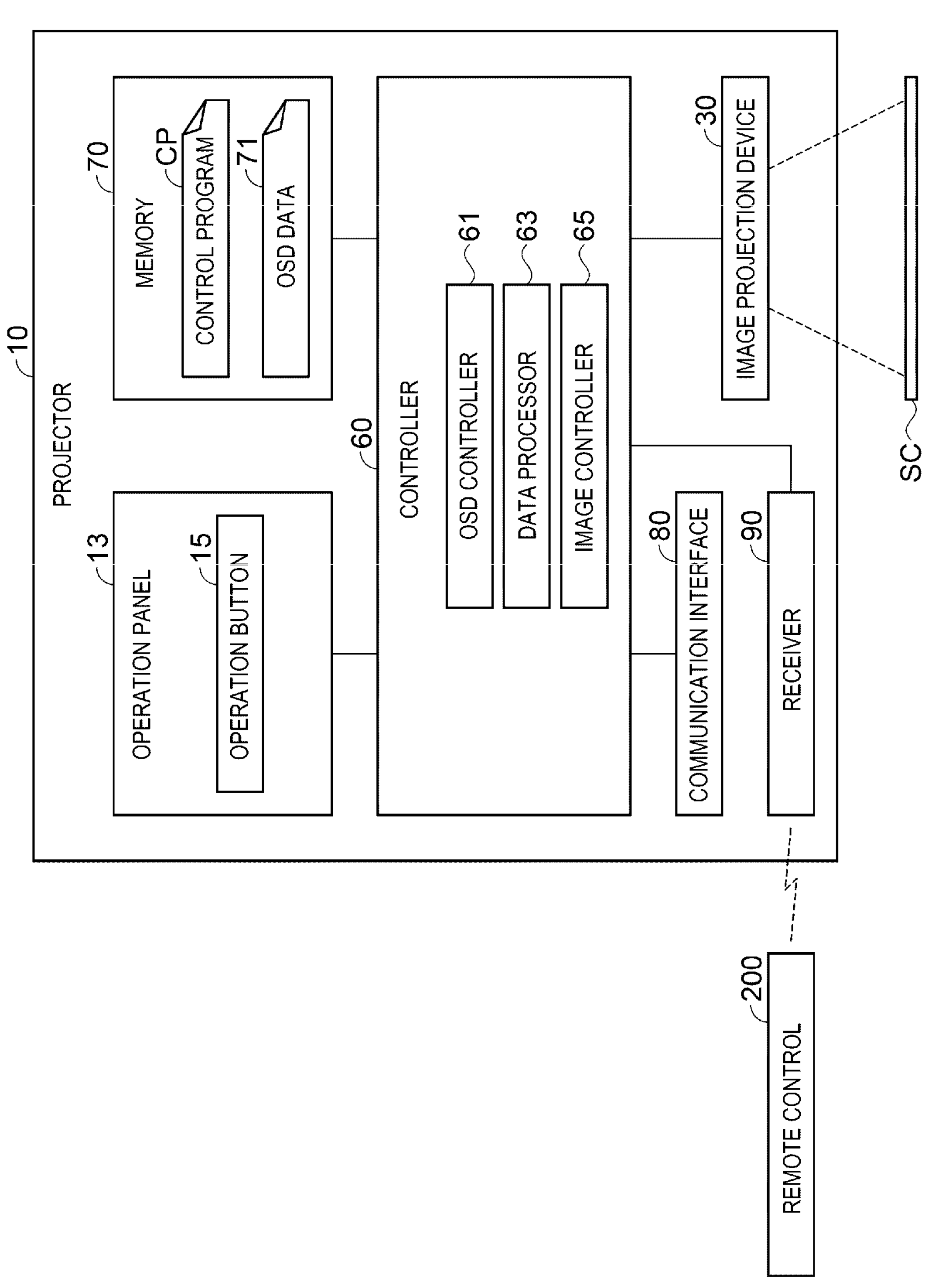
FIG. 3 is a diagram showing a block configuration of a projector.

FIG. 3 shows a block configuration of the projector 10. FIG. 3 shows the projector 10 and the remote control 200. The projector 10 and the remote control 200 communicate with each other through infrared line communication or Bluetooth communication.

The projector 10 includes the operation panel 13, the image projection device 30, the controller 60, the memory 70, a communication interface 80, and a receiver 90. The projector 10 includes a power supply unit (not shown) and the like.

The operation panel 13 includes a plurality of operation buttons 15. Examples of the plurality of operation buttons 15 include a menu button, a return button, an operation determination button, a selection button, an adjustment button, and an initial value button. The user M appropriately selects a desired operation button 15 from the plurality of operation buttons 15 and performs an input operation on the operation button 15. The operation panel 13 receives an input operation from the user M.

The image projection device 30 forms image light according to image information input from an external device. The image projection device 30 enlarges and projects image light onto the projection surface SC. The image projection device 30 projects the projection image PG onto the projection surface SC based on control of the controller 60. The image projection device 30 projects the projection image PG onto the projection surface SC based on the image data transmitted from the image providing device 300. The image projection device 30 projects an OSD image onto the projection surface SC. The OSD is an abbreviation for on-screen display. The OSD image is displayed in the projection image PG. The OSD image displays settings, operation information, and the like of the projector 10. The image projection device 30 corresponds to an example of an optical device.

The image projection device 30 includes a light source unit, an image forming unit, and a projection optical unit. The light source unit, the image forming unit, the projection optical unit, and the like are not shown. The light source unit includes, for example, a solid light source and a wavelength conversion element. The image forming unit includes, for example, one or more transmissive liquid crystal panels. The image forming unit may include one or more digital micromirror devices (DMDs). The projection optical unit includes, for example, one or more lenses. At least a portion of the projection optical unit may be configured to be detachable from the image projection device 30.

The controller 60 is a controller that controls the projector 10. The controller 60 is, for example, a processor including a central processing unit (CPU). The controller 60 includes one or more processors. The controller 60 may include a semiconductor memory such as a read only memory (ROM) or a random access memory (RAM). The semiconductor memory functions as a work area of the controller 60. The controller 60 functions as various functional units by executing a control program CP. The control program CP is stored in the memory 70. The controller 60 functions as an OSD controller 61, a data processor 63, and an image controller 65 by executing the control program CP. The controller 60 corresponds to an example of a processing device.

The OSD controller 61 is a functional unit that displays various OSD images in the projection image PG. The OSD controller 61 displays various OSD images based on OSD data 71. The OSD data 71 is stored in the memory 70. The OSD image includes a setting image 100, a selection image 101, and the like. The setting image 100 and the selection image 101 will be described later. The OSD image may include any of various messages, an image indicating an operation, an input data image, and the like.

The data processor 63 is a functional unit that calculates size data corresponding to the length of the projection image PG projected onto the projection surface SC. The data processor 63 calculates the size data based on input data input by the user M. The size data is the length of the projection image PG projected onto the projection surface SC. The size data is calculated by the data processor 63. The size data is, for example, the diagonal line length Y of the projection image PG projected onto the projection surface SC. The size data may be either the projection image height PH or the projection image width PW. When the size data is either the projection image height PH or the projection image width PW, a size of the projection image PG projected onto the projection surface SC is obtained based on either the projection image height PH or the projection image width PW and the aspect ratio.

The data processor 63 outputs the size data. The data processor 63 outputs the size data to the OSD controller 61. The size data is input to the OSD controller 61. The OSD controller 61 displays various images in the projection image PG based on the size data. The data processor 63 may output the size data to an external device via the communication interface 80. The data processor 63 may output the size data to the memory 70. The memory 70 stores the size data.

The image controller 65 performs image processing on the image data transmitted from the image providing device 300. The image controller 65 corrects the image data using various setting values. Various setting values are stored in the memory 70. The setting value is an aspect ratio, contrast, brightness, a correction value related to geometric distortion correction, or the like. The image controller 65 may perform image processing for superimposing and displaying the OSD image on an image based on the image data.

The memory 70 stores various pieces of data. The memory 70 is implemented by RAM, ROM, and the like. The memory 70 stores the control program CP and the OSD data 71. The memory 70 stores various setting values used by the image controller 65, size data calculated by the data processor 63, and the like.

The control program CP is firmware that causes the controller 60 to function as various functional units. The control program CP causes the controller 60 to operate as the OSD controller 61, the data processor 63, and the image controller 65. The control program CP may cause the controller 60 to operate as a functional unit other than the OSD controller 61, the data processor 63, and the image controller 65. The control program CP corresponds to an example of a program.

The OSD data 71 is various pieces of data related to the OSD image displayed in the projection image PG. The OSD data 71 includes various pieces of ratio data. The various pieces of ratio data will be described later. The OSD data 71 stores various pieces of image setting data used to generate the setting image 100, the selection image 101, the measurement image 110, and the like.

The communication interface 80 is an interface circuit communicably connected with the image providing device 300. The communication interface 80 is connected to the image providing device 300 in a wired or wireless manner according to a predetermined communication protocol. The communication interface 80 includes a wired connector and a wireless communication port. The wired connector is a high-definition multimedia interface (HDMI) connector, a universal serial bus (USB) connector, a local area network (LAN) connector, or the like. The wireless communication port is a Wi-Fi communication port, a Bluetooth communication port, or the like. HDMI, Wi-Fi, and Bluetooth are registered trademarks. The communication interface 80 receives image data from the image providing device 300. The communication interface 80 transmits various pieces of setting data and the like of the projector 10 to the image providing device 300. The communication interface 80 may transmit the size data to the image providing device 300. The communication interface 80 may be communicably connected to an external device different from the image providing device 300. The communication interface 80 transmits various pieces of setting data, size data, and the like to the external device. The communication interface 80 outputs size data to the image providing device 300 or the external device.

The receiver 90 receives an operation signal transmitted from the remote control 200. The receiver 90 receives the operation signal by infrared line communication or Bluetooth communication. The receiver 90 includes an antenna and a receiving circuit for receiving the operation signal. The operation signal includes a power supply operation signal for operating power supply of the projector 10, an instruction signal related to the OSD image, an adjustment signal, and the like. The receiver 90 transmits the operation signal to the controller 60. The controller 60 receives the operation signal as the input data and performs various types of control based on the operation signal.

The remote control 200 transmits an operation signal to the receiver 90. When the user M performs an input operation on any of the various buttons on the remote control 200, the remote control 200 transmits an operation signal to the receiver 90. The remote control 200 transmits an operation signal corresponding to each of the plurality of buttons to the receiver 90.

Figure 4:
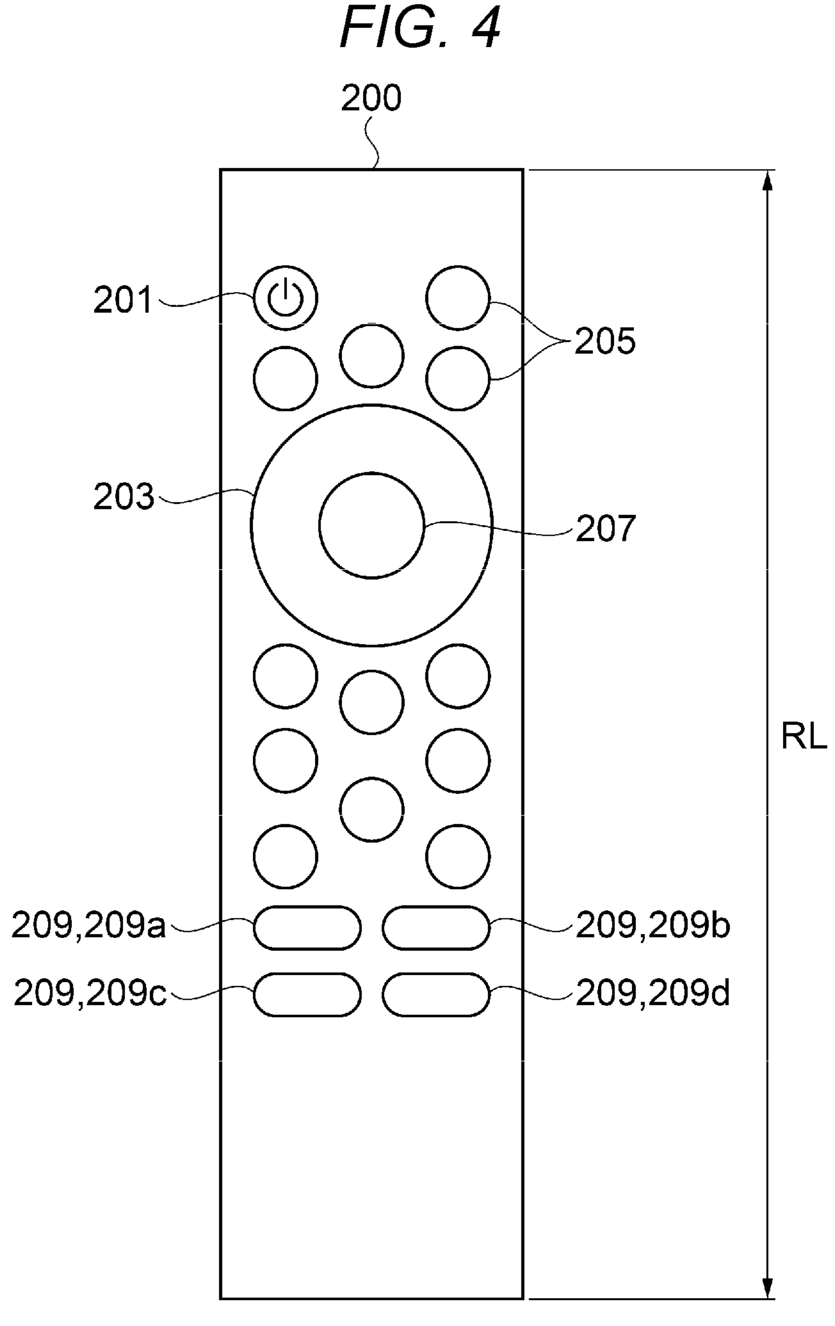
FIG. 4 is a diagram showing a schematic configuration of a remote control.

FIG. 4 shows a schematic configuration of the remote control 200. The remote control 200 includes, as a plurality of buttons, a power button 201, up, down, left, and right buttons 203, a plurality of input buttons 205, a determination button 207, and a plurality of assignment buttons 209. At least one side of an exterior of the remote control 200 is implemented by a remote control width RL. The remote control width RL corresponds to an example of a controller width.

The power button 201 is used to turn on or off the power supply of the projector 10. When the user M performs an input operation on the power button 201, the remote control 200 outputs, to the projector 10, a power supply operation signal for turning on or off the power supply of the projector 10.

The up, down, left, and right buttons 203 are used to select various icons or the like. When selecting one of a plurality of icons or the like displayed in the projection image PG, the user M performs an input operation on the up, down, left, and right buttons 203. The remote control 200 transmits, to the projector 10, an operation signal for selecting one of the plurality of icons and the like.

The plurality of input buttons 205 are used when the user M performs various adjustments, instructions, and the like. The plurality of input buttons 205 correspond to various adjustments and instructions. The plurality of input buttons 205 include, for example, any one of a home button, a volume adjustment button, a distortion correction button, and a projector setting button. The number of input buttons 205 can be set as appropriate.

The determination button 207 is used when the user M determines a content of the input operation. When determining to select one of the plurality of icons or the like, the user M performs an input operation on the determination button 207. The remote control 200 transmits an operation signal indicating the determination to the projector 10.

The plurality of assignment buttons 209 are buttons to which functions can be assigned. When the projector 10 projects the projection image PG including a predetermined image, the assignment button 209 has a function of outputting an operation signal corresponding to the image. Each of the plurality of assignment buttons 209 corresponds to a symbol displayed on a first label image **103*a* or the like to be described later as an example. The remote control 200 shown in FIG. 4 includes a first assignment button 209*a*, a second assignment button 209*b*, a third assignment button 209*c*, and a fourth assignment button 209*d*. The number of assignment buttons 209 can be set as appropriate. Any one of the plurality of input buttons 205 may function as the assignment button 209**.

Figure 5:
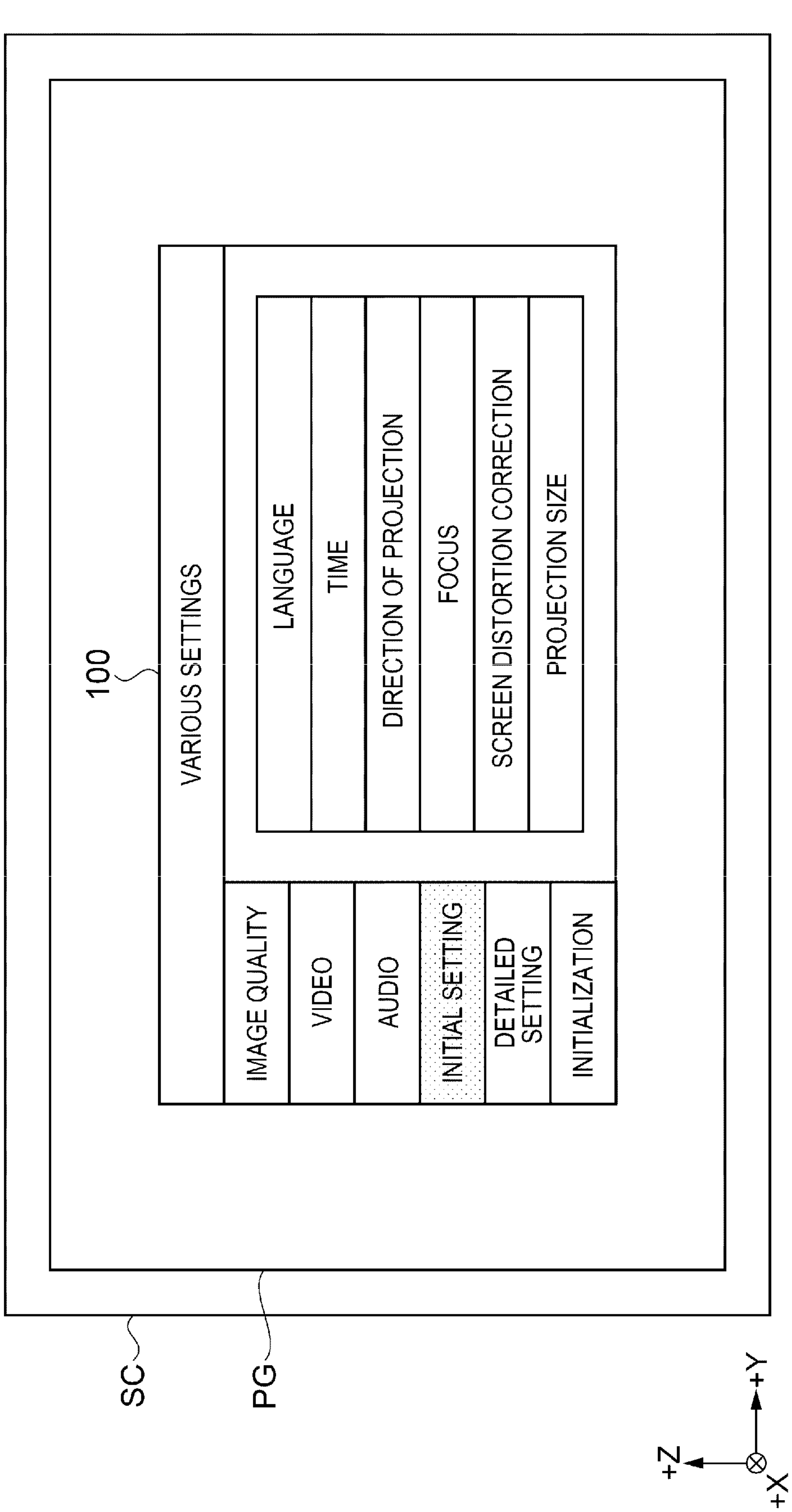
FIG. 5 is a diagram showing the projection image including a setting image.

FIG. 5 shows the projection image PG including the setting image 100. The setting image 100 is an example of the OSD image. The setting image 100 is displayed in the projection image PG when the user M performs a predetermined input operation. For example, when the user M performs an input operation on the projector setting button in the plurality of input buttons 205, the setting image 100 is displayed. When the user M turns on the power supply of the projector 10 for the first time, the setting image 100 may be displayed.

The setting image 100 shown in FIG. 5 displays image quality, video, audio, initial setting, detailed setting, and initialization as a menu. The setting image 100 shown in FIG. 5 displays a submenu when the initial setting is selected. The submenu includes language, time, direction of projection, focus, screen distortion correction, and projection size. When the user M selects one of the plurality of submenus, a setting corresponding to the submenu can be performed.

First Embodiment

A first embodiment shows a method for calculating the size data using a first selection image **101*a*. The first selection image 101*a* is an example of the selection image 101 and is an OSD image. The user M can select one of the two calculation methods. The user M can select a calculation method according to a usage condition of the projector 10. The projector 10 can provide a method for calculating the size data according to a situation of the user M. In other words, the projector 10** can determine a size of the projection image PG.

Figure 6:
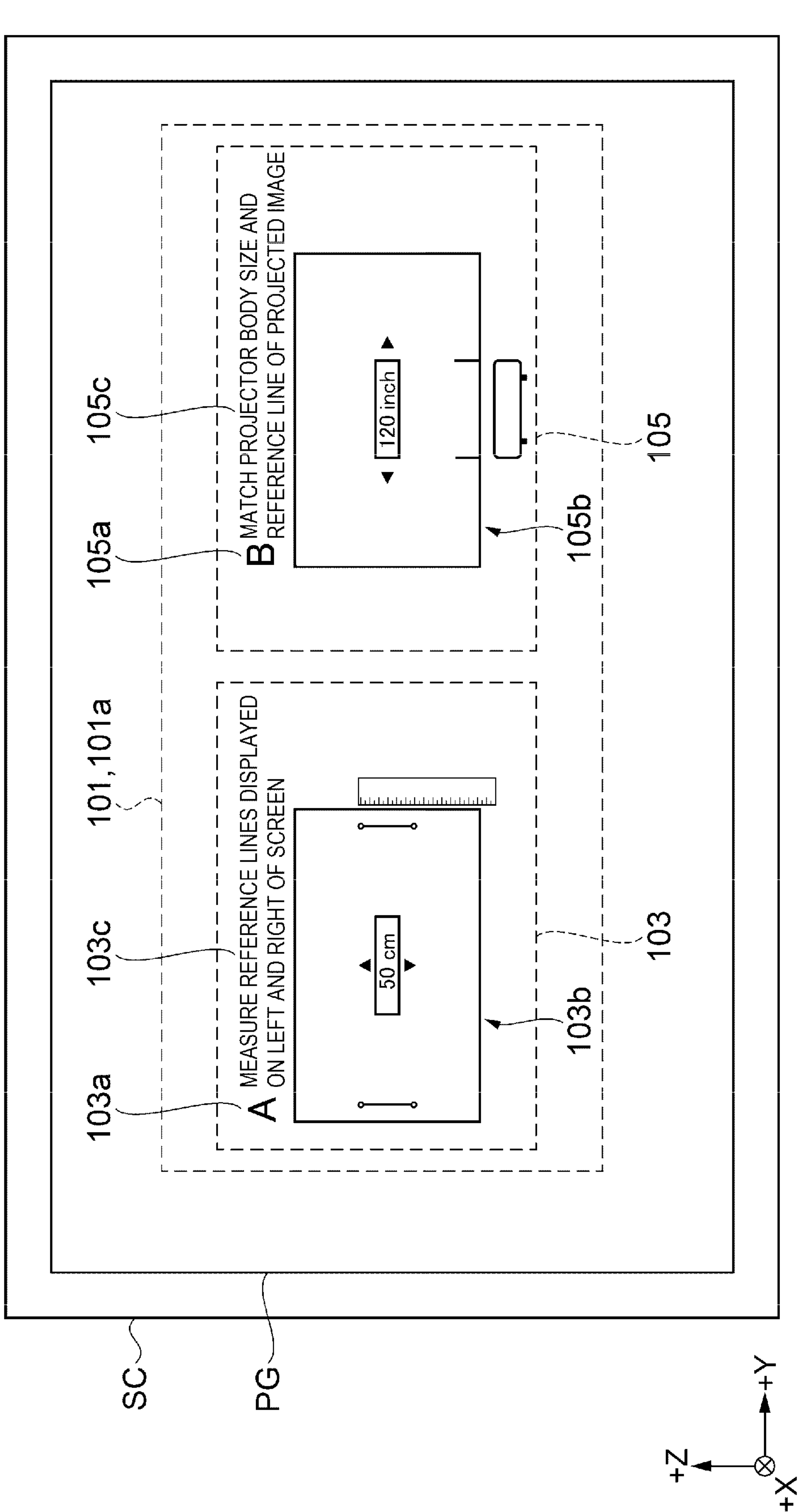
FIG. 6 is a diagram showing the projection image including a selection image.

FIG. 6 shows the projection image PG including the selection image 101. FIG. 6 shows the projection image PG including the first selection image **101*a* which is an example of the selection image 101. The first selection image 101*a* is generated by the OSD controller 61 based on the OSD data 71. The projector 10 uses the image projection device 30 to project the projection image PG including the first selection image 101*a* onto the projection surface SC. The first selection image 101*a* is an image for selecting one of the two calculation methods. The first selection image 101*a* includes a first option image 103 and a second option image 105. The calculation method corresponds to an example of a method. The first selection image 101*a*** corresponds to an example of a first image.

The first option image 103 indicates a first calculation method. The first calculation method will be described later. When the user M selects the first option image 103, the first calculation method is selected. The user M can use the operation panel 13 or the remote control 200 to select the first option image 103. The first option image 103 includes the first label image **103*a*, a first illustration image 103*b*, and a first text 103*c*. The first option image 103** corresponds to an example of a fourth image.

The first label image **103*a* is a label indicating the first option image 103. The first label image 103*a* is referred to when the user M uses the assignment button 209. The first label image 103*a* displays a symbol. The first label image 103*a* shown in FIG. 6 indicates a first symbol A. The first symbol A corresponds to the first assignment button 209*a*. When selecting the first option image 103, the user M performs an input operation on the first assignment button 209*a*. When the input operation is performed on the first assignment button 209*a*, the first calculation method corresponding to the first option image 103** is selected.

The first illustration image **103*b* indicates a method for measuring a measurement value used in the first calculation method. The first illustration image 103*b* shows a measurement image 110 to be described later and an illustration of a measuring instrument. The user M can confirm the method for measuring the measurement value by visually recognizing the first illustration image 103*b***.

The first text **103*c* indicates the method for measuring the measurement value used in the first calculation method by text. The first text 103*c* indicates that a length of a reference line is to be measured using the measuring instrument. The user M can confirm the method for measuring the measurement value by visually recognizing the first text 103*c***.

The first option image 103 shown in FIG. 6 includes the first illustration image **103*b* and the first text 103*c*, but is not limited thereto. The first option image 103 may include either the first illustration image 103***b* or the first text 103*c*.

The second option image 105 indicates a second calculation method. The second calculation method will be described later. When the user M selects the second option image 105, the second calculation method is selected. The user M can use the operation panel 13 or the remote control 200 to select the second option image 105. The second option image 105 includes a second label image 105*a*, a second illustration image 105*b*, and a second text 105*c*. The second option image 105 corresponds to an example of the fourth image.

The second label image 105*a* is a label indicating the second option image 105. The second label image 105*a* is referred to when the user M uses the assignment button 209. The second label image 105*a* displays a symbol. The second label image 105*a* shown in FIG. 6 indicates a second symbol B. The second symbol B corresponds to the second assignment button 209*b*. When selecting the second option image 105, the user M performs an input operation on the second assignment button 209*b*. When the input operation is performed on the second assignment button 209*b*, the second calculation method corresponding to the second option image 105 is selected.

The second illustration image 105*b* indicates a method for acquiring adjustment data used in the second calculation method. The second illustration image 105*b* shows an adjustment image 120 to be described later and an image of the projector 10. The image of the projector 10 represents an object that is an adjustment target. The user M can confirm the method for acquiring the adjustment data by visually recognizing the second illustration image 105*b*.

The second text 105*c* indicates a method for acquiring the adjustment data used in the second calculation method by text. The second text 105*c* indicates an instruction to match a body size of the projector 10 and a width of the reference line. The user M can confirm the method for acquiring the adjustment data by visually recognizing the second text 105*c*.

The second option image 105 shown in FIG. 6 includes the second illustration image 105*b* and the second text 105*c*, but is not limited thereto. The second option image 105 may include either the second illustration image 105*b* or the second text 105*c*.

FIG. 7 shows the projection image PG including the measurement image 110. The projection image PG including the measurement image 110 is projected onto the projection surface SC by the image projection device 30. FIG. 7 shows a first measurement image 110*a* which is an example of the measurement image 110. The first measurement image 110*a* is used when the user M measures a target image length MH. The first measurement image 110*a* is projected into the projection image PG when the first option image 103 is selected by the user M. The first measurement image 110*a* includes a first measurement target image 111*a*, a message image 113, a measurement data display field 115, a data input icon 117, and a display field 119. The OSD controller 61 of the controller 60 uses the image projection device 30 to project, onto the projection surface SC, the first measurement image 110*a* including the first measurement target image 111*a*, the message image 113, the measurement data display field 115, the data input icon 117, and the display field 119. FIG. 7 shows a first virtual line VL1 and a second virtual line VL2.

The first virtual line VL1 and the second virtual line VL2 are virtual lines parallel to the Z axis. The first virtual line VL1 and the second virtual line VL2 divide the long side of the projection image PG into three equal parts. The projection image PG is divided into a first divided region A1, a second divided region A2, and a third divided region A3 by the first virtual line VL1 and the second virtual line VL2. The second divided region A2 corresponds to a central region of the projection image PG. The first divided region A1 is disposed at a position in the −Y direction of the second divided region A2. The first divided region A1 corresponds to a side region at an end in the −Y direction relative to the central region of the projection image PG. The third divided region A3 is disposed at a position in the +Y direction of the second divided region A2. The third divided region A3 corresponds to a side region at an end in the +Y direction relative to the central region of the projection image PG.

The first measurement target image 111*a* is an image in which the target image length MH can be measured by the user M. The first measurement target image 111*a* is an example of a measurement target image 111. The first measurement target image 111*a* has the target image length MH along the Z axis. The first measurement target image 111*a* is disposed parallel or substantially parallel to the short side of the projection image PG. FIG. 7 shows two first measurement target images 111*a*, but is not limited thereto. One first measurement target image 111*a* or three or more first measurement target images 111*a* may be displayed in the first measurement image 110*a*. The first measurement target image 111*a* shown in FIG. 7 includes two circles and a straight line connecting the two circles. The target image length MH is a distance between centers of the two circles. The measurement target image 111 including the first measurement target image 111*a* corresponds to an example of a second image. The target image length MH corresponds to an example of a length.

The two first measurement target images 111*a* shown in FIG. 7 are displayed in the first divided region A1 and in the third divided region A3. The first measurement target image 111*a* is preferably displayed in one of the first divided region A1 and the third divided region A3.

Figure 8:
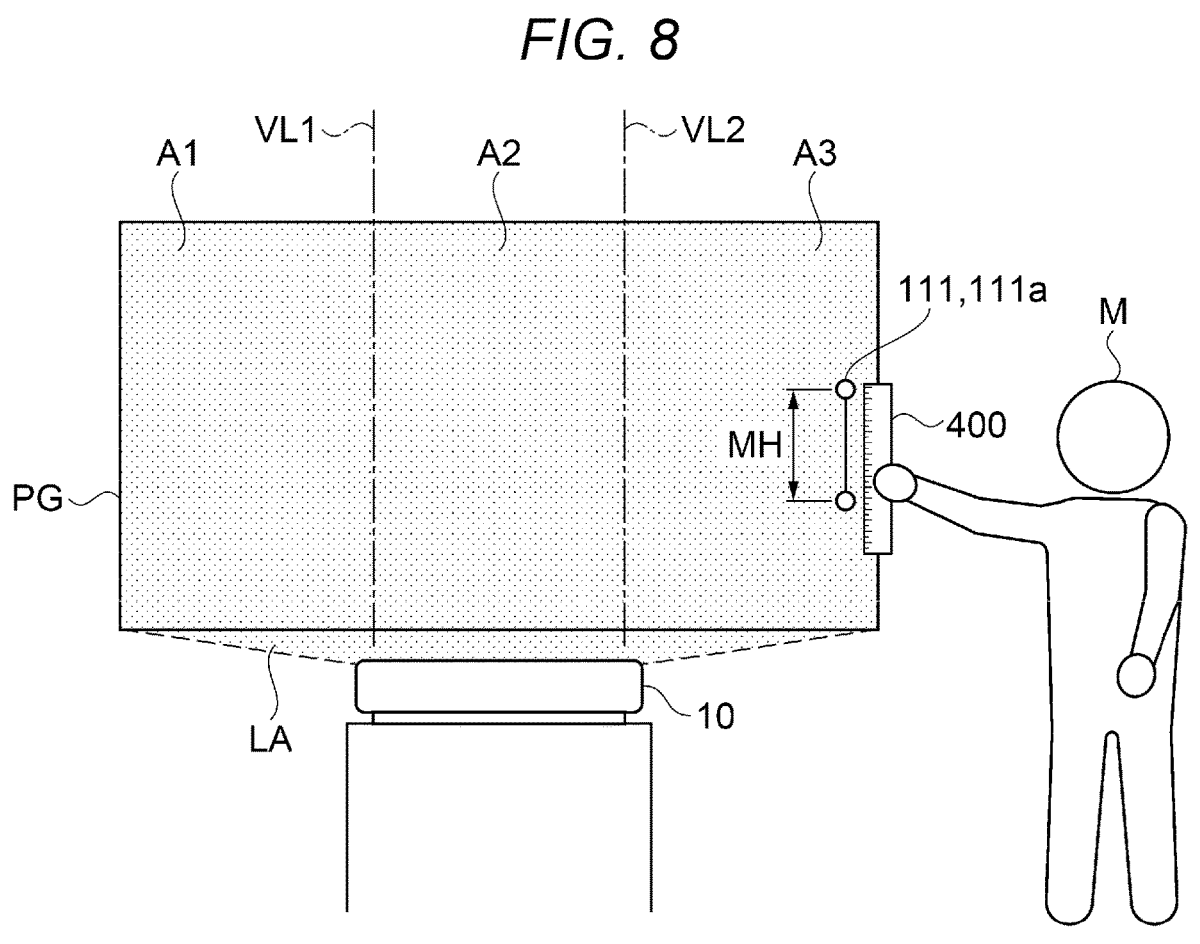

FIG. 8 shows a state when the user M measures the measurement target image 111. FIG. 8 shows a state in which the user M measures the first measurement target image 111*a* in the third divided region A3. FIG. 8 shows the projector 10, an image light region LA, the projection image PG, the user M, and a ruler 400. FIG. 8 shows the first virtual line VL1 and the second virtual line VL2. FIG. 8 shows the first divided region A1, the second divided region A2, and the third divided region A3 divided by the first virtual line VL1 and the second virtual line VL2.

The projector 10 projects the projection image PG including the first measurement target image 111*a*. In FIG. 8, the projector 10 projects the projection image PG onto a wall surface which is an example of the projection surface SC. The projector 10 emits image light indicating the projection image PG from the image projection device 30.

The image light region LA is a region through which the image light emitted from the image projection device 30 passes. The image light region LA is a region through which the image light passes between an image light emission position of the image projection device 30 and the wall surface. When the user M enters the image light region LA, a shadow appears on the projection image PG.

The projection image PG shown in FIG. 8 includes one first measurement target image 111*a*. The first measurement target image 111*a* is displayed in the third divided region A3. The first measurement target image 111*a* is implemented by an image having the target image length MH along the short side of the projection image PG.

The user M uses the ruler 400 to measure the target image length MH. The user M is located near the projection image PG and uses the ruler 400 to measure the target image length MH of the first measurement target image 111*a*.

The ruler 400 is used when the user M measures the target length MH. The ruler 400 is prepared in advance by the user M. The user M may use an instrument capable of measuring the target image length MH, such as a measuring tape, instead of the ruler 400. The ruler 400 is an example of the measuring instrument.

The first measurement target image 111*a* is displayed in the third divided region A3. Since the first measurement target image 111*a* is displayed in the third divided region A3, the user M can measure the target image length MH with minimum penetration into the image light region LA. It is possible to reduce difficulty in visually recognizing the first measurement target image 111*a* due to the shadow of the user M. When the first measurement target image 111*a* is displayed in the first divided region A1, a similar effect is obtained. The first measurement target image 111*a* is preferably displayed in the first divided region A1 or in the third divided region A3.

The message image 113 shown in FIG. 7 is an image that displays information to be notified to the user M. The message image 113 shown in FIG. 7 is a message prompting the user M to measure the target image length MH of the first measurement target image 111*a*. The message image 113 shown in FIG. 7 represents the first measurement target image 111*a* as the reference line. A content of the message image 113 is appropriately set.

The measurement data display field 115 displays an input measurement value. A measurement result input by the user M through the operation panel 13 or the remote control 200 is displayed. The measurement data display field 115 shown in FIG. 7 displays the measurement value in units of cm, but is not limited thereto. A unit of the measurement value is appropriately set.

The data input icon 117 is referred to when the user M inputs a measurement value. The data input icon 117 corresponds to a part of the up, down, left, and right buttons 203 on the remote control 200. When the operation panel 13 has a direction instruction button in the operation button 15 similar to the up, down, left, and right buttons 203, the data input icon 117 corresponds to the direction instruction button. The data input icon 117 includes a first data input icon 117*a* and a second data input icon 117*b*.

The first data input icon 117*a* corresponds to the up button in the up, down, left, and right buttons 203. The first data input icon 117*a* indicates to the user M that the up button can be used for an input operation. When the user M performs the input operation on the up button, the measurement value displayed in the measurement data display field 115 increases.

The second data input icon 117*b* corresponds to the down button in the up, down, left, and right buttons 203. The second data input icon 117*b* indicates to the user M that the down button can be used for an input operation. When the user M performs the input operation on the down button, the measurement value displayed in the measurement data display field 115 decreases. The user M inputs the measurement value by performing an input operation on the up button or on the down button.

The display field 119 displays the size of the projection image PG corresponding to the measurement value input to the measurement data display field 115. The display field 119 displays the diagonal line length Y which is an example of the size of the projection image PG. When the user M changes the measurement value input to the measurement data display field 115, the size of the projection image PG corresponding to the changed measurement value is displayed. The display field 119 shown in FIG. 7 displays a size value in units of inches, but is not limited thereto. A unit of the size value is appropriately set.

The projector 10 can calculate the size data by the first calculation method by projecting the projection image PG including the measurement image 110 onto the projection surface SC. The projector 10 allows the user M to measure the target image length MH of the measurement target image 111. When the user M inputs a measurement value, the projector 10 calculates size data. The first calculation method, which is a method for calculating the size data using the measurement target image 111, corresponds to an example of a first method.

The user M measures the target image length MH of the first measurement target image 111*a*. The user M inputs a measurement value to the projector 10. The user M measures the target image length MH of the first measurement target image 111*a* displayed in the projection image PG using the ruler 400. The projector 10 acquires the measurement value. The data processor 63 of the projector 10 uses the measurement value to calculate the size data of the projection image PG. The data processor 63 calculates the diagonal line length Y, which is an example of the size data, using the following formula (1).

$$Y = \sqrt{(c_1 X)^2 \times \left(1 + \left(\frac{a}{b}\right)^2\right)} \tag{1}$$

Here, $c_1$ is a first ratio data. The first ratio data is a height ratio which is a ratio of the target image length MH to the projection image height PH of the projection image PG. The first ratio data is stored in the memory 70 in advance. The first ratio data is an example of ratio data. X is a measurement value of the target image length MH of the first measurement target image 111*a* input by the user M. a and b are values representing the aspect ratio. The data processor 63 can calculate the diagonal line length Y by substituting the measurement value into formula (1). The data processor 63 outputs the diagonal line length Y as the size data to the OSD controller 61, the image providing device 300, and the like.

When the size data is input, the OSD controller 61 adjusts sizes of various images in the OSD image. The OSD controller 61 adjusts sizes of images other than the first measurement target image 111*a*, such as the message image 113 and the measurement data display field 115, based on the size data. The OSD controller 61 may adjust a size of the setting image 100. By adjusting the size of the setting image 100 based on the size data, the user M can easily visually recognize the setting image 100. A size of the first measurement target image 111*a* is maintained at a size before the size data is input.

When the size data is input, the image providing device 300 may correct the image data to be transmitted to the projector 10. The image providing device 300 uses the size data to correct the image data. For example, the image providing device 300 adjusts, based on the image data, a size of a partial image in the projection image PG displayed on the projection surface SC. The partial image is an insert image or the like indicating a face or the like of a person. The image providing device 300 can display the size of the partial image in the projection image PG in a size close to an actual size by adjusting the size of the partial image.

Figure 9:
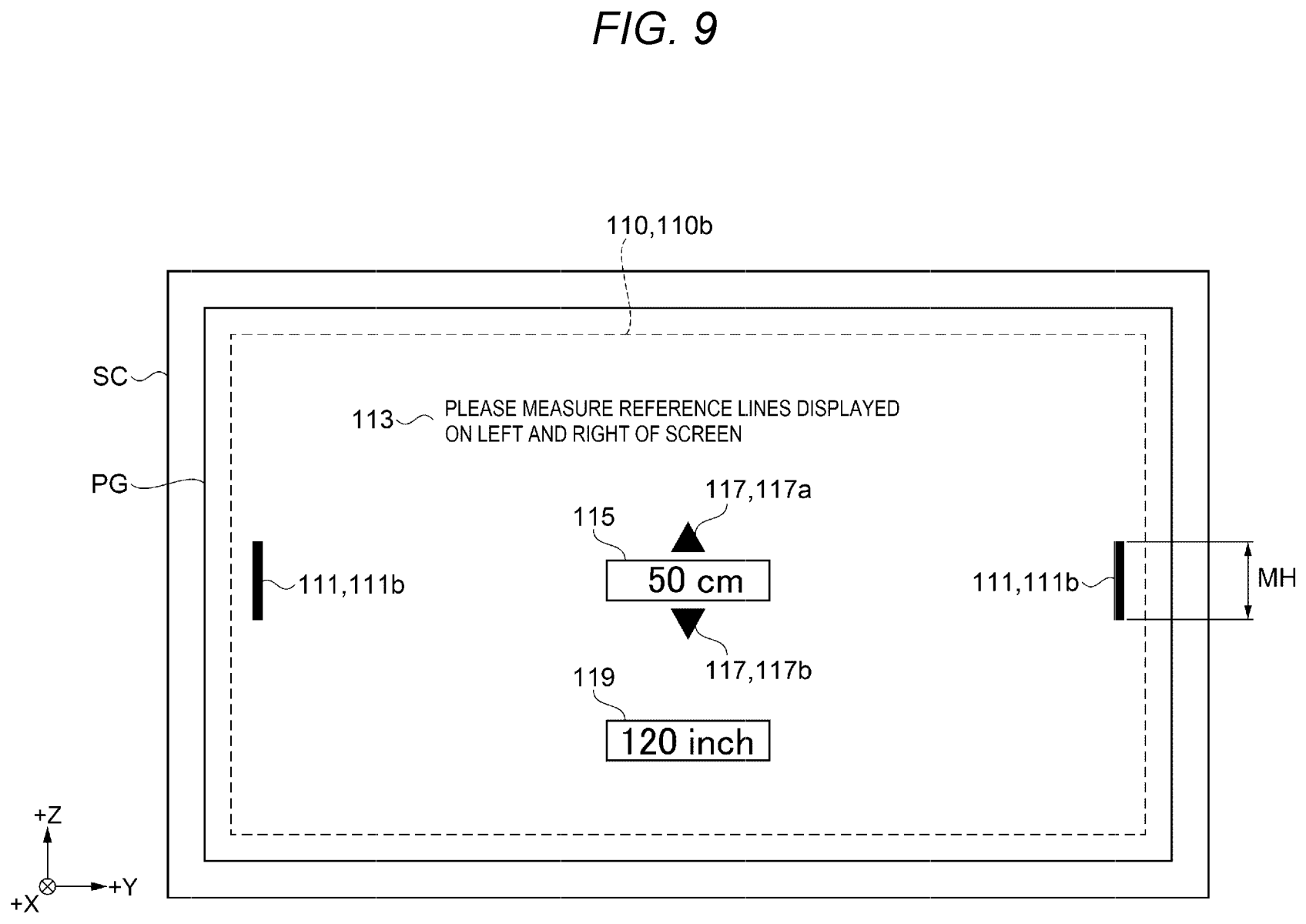

FIG. 9 shows the projection image PG including the measurement image 110. The projection image PG including the measurement image 110 is projected onto the projection surface SC by the image projection device 30. FIG. 9 shows a second measurement image 110*b* which is an example of the measurement image 110. The second measurement image 110*b* is used when the user M measures the target image length MH. The second measurement image 110*b* is projected into the projection image PG instead of the first measurement image 110*a* when the first option image 103 is selected by the user M. The second measurement image 110*b* includes the second measurement target image 111*b*, the message image 113, the measurement data display field 115, the data input icon 117, and the display field 119. The OSD controller 61 of the controller 60 uses the image projection device 30 to project, onto the projection surface SC, the second measurement image 110*b* including the second measurement target image 111*b*, the message image 113, the measurement data display field 115, the data input icon 117, and the display field 119.

The message image 113, the measurement data display field 115, the data input icon 117, and the display field 119 in the second measurement image 110*b* are the same as the message image 113, the measurement data display field 115, the data input icon 117, and the display field 119 in the first measurement image 110*a*, respectively.

A shape of the second measurement target image 111*b* is different from that of the first measurement target image 111*a*. The second measurement target image 111*b* is a rectangular image having a long side and a short side. The long side of the second measurement target image 111*b* is parallel or substantially parallel to the short side of the projection image PG. A length of the long side of the second measurement target image 111*b* corresponds to the target image length MH.

A shape of the measurement target image 111 is not limited to the shape of the first measurement target image 111*a* and the shape of the second measurement target image 111*b*. The shape of the measurement target image 111 is not limited as long as the user M can measure the target image length MH.

FIG. 10 shows the projection image PG including the adjustment image 120. The projection image PG including the adjustment image 120 is projected onto the projection surface SC by the image projection device 30. FIG. 10 shows a first adjustment image 120*a* as an example of the adjustment image 120. The first adjustment image 120*a* is used when the user M adjusts an adjustment image width AW. The first adjustment image 120*a* is projected into the projection image PG when the second option image 105 is selected by the user M. The first adjustment image 120*a* includes a first adjustment target image 121*a*, an adjustment message image 123, a size display field 125, and an adjustment amount input icon 127. The OSD controller 61 of the controller 60 uses the image projection device 30 to project, onto the projection surface SC, the first adjustment image 120*a* including the first adjustment target image 121*a*, the adjustment message image 123, the size display field 125, and the adjustment amount input icon 127. FIG. 10 shows the virtual horizontal line VH.

The first adjustment target image 121*a* is an image that allows the user M to adjust the adjustment image width AW. The first adjustment target image 121*a* is an example of the adjustment target image 121. The first adjustment target image 121*a* shown in FIG. 10 includes two line images. A width along the Y axis between the two line images corresponds to the adjustment image width AW. The first adjustment target image 121*a* is displayed in the second region R2 of the projection image PG. When the projector 10 is disposed below the projection surface SC, the first adjustment target image 121*a* is preferably displayed in the second region R2 at a lower part of the projection image PG. The adjustment target image 121 including the first adjustment target image 121*a* corresponds to an example of a third image. The adjustment image width AW corresponds to an example of a width.

The adjustment image width AW of the first adjustment target image 121*a* can be changed by the user M. The adjustment image width AW of the first adjustment target image 121*a* is enlarged or reduced by an input operation of the user M. When the user M performs an input operation on the operation panel 13 or on the remote control 200, the adjustment image width AW is enlarged or reduced. The user M enlarges or reduces the adjustment image width AW to match or substantially match the adjustment image width AW and a width of the object.

The adjustment message image 123 is an image for displaying information to be notified to the user M. The adjustment message image 123 is a message prompting the user M to adjust the adjustment image width AW. The adjustment message image 123 represents the first adjustment target image 121*a* as the reference line. The adjustment message image 123 is a message for requesting the user M to match the adjustment image width AW with the case width PL of the projector 10. A content of the adjustment message image 123 is appropriately set.

The size display field 125 displays the size of the projection image PG corresponding to the adjustment image width AW. The size display field 125 displays the diagonal line length Y which is an example of the size of the projection image PG. When the user M changes the adjustment image width AW, the size of the projection image PG corresponding to the changed adjustment image width AW is displayed. The size display field 125 shown in FIG. 10 displays a size value in units of inches, but is not limited thereto. A unit of the size value is appropriately set.

The adjustment amount input icon 127 is referred to when the user M adjusts the adjustment image width AW. The adjustment amount input icon 127 corresponds to a part of the up, down, left, and right buttons 203 on the remote control 200. When the operation panel 13 has a direction instruction button in the operation button 15 similar to the up, down, left, and right buttons 203, the adjustment amount input icon 127 corresponds to the direction instruction button. The adjustment amount input icon 127 includes a first adjustment amount input icon 127*a* and a second adjustment amount input icon 127*b*.

The first adjustment amount input icon 127*a* corresponds to the right button in the up, down, left, and right buttons 203. The first adjustment amount input icon 127*a* indicates to the user M that the right button can be used for an input operation. When the user M performs the input operation on the right button, the adjustment image width AW of the first adjustment target image 121*a* is enlarged.

The second adjustment amount input icon 127*b* corresponds to the left button in the up, down, left, and right buttons 203. The second adjustment amount input icon 127*b* indicates to the user M that the left button can be used for an input operation. When the user M performs the input operation on the left button, the adjustment image width AW of the first adjustment target image 121*a* is reduced. The user M adjusts the adjustment image width AW by performing an input operation on the right button or on the left button.

The projector 10 can calculate the size data by the second calculation method by projecting the projection image PG including the adjustment image 120 onto the projection surface SC. The projector 10 allows the user M to adjust the adjustment image width AW of the adjustment target image 121. When the user M adjusts the adjustment image width AW, the projector 10 calculates size data. The second calculation method, which is the method for calculating the size data using the adjustment target image 121, corresponds to an example of a second method.

The user M matches or substantially matches the adjustment image width AW with the case width PL of the case 11 which is the exterior of the projector 10. The user M enlarges or reduces the adjustment image width AW to match or substantially match the adjustment image width AW and the case width PL. When the user M enlarges or reduces the adjustment image width AW, the OSD controller 61 outputs width ratio data corresponding to an amount of enlargement or an amount of reduction of the adjustment image width AW. The amount of enlargement or the amount of reduction is an example of the adjustment data. The width ratio data is an example of second ratio data. The width ratio data is a width ratio of the adjustment image width AW to the projection image width PW of the projection image PG. A relationship between the adjustment image width AW and the width ratio data is set in advance and stored in the memory 70. When the adjustment image width AW matches the case width PL, the width ratio data is set as reference width ratio data, which is a value that is a preset size of the projection image PG. As an example, the width ratio data is set in advance to a value at which the diagonal line length Y is 120 inches when the adjustment image width AW matches the case width PL. The OSD controller 61 transmits the width ratio data corresponding to the amount of enlargement or the amount of reduction to the data processor 63.

The data processor 63 receives the width ratio data corresponding to the amount of enlargement or the amount of reduction. The data processor 63 calculates the diagonal line length Y, which is an example of the size data, using the following formula (2).

$$Y = \sqrt{(c_2 X)^2 \times \left(1 + \left(\frac{b}{a}\right)^2\right)} \tag{2}$$

Here, $c_2$ is the second ratio data. X is a reference value. The reference value is an actual size value of the case width PL of the projector 10. The adjustment image width AW is set based on the case width PL. The actual size value of the case width PL is stored in the memory 70 in advance as the reference value. a and b are values representing the aspect ratio. The data processor 63 can calculate the diagonal line length Y by substituting the width ratio data corresponding to the adjustment data into formula (2). The data processor 63 outputs the diagonal line length Y as the size data to the OSD controller 61, the image providing device 300, and the like.

When the size data is input, the OSD controller 61 adjusts the sizes of various images in the OSD image. The OSD controller 61 adjusts sizes of the images other than the first adjustment target image 121*a*, such as the adjustment message image 123 and the size display field 125, based on the size data. The OSD controller 61 adjusts the size of the setting image 100 as an example. By adjusting the size of the setting image 100 based on the size data, the user M can easily visually recognize the setting image 100. The size of the first adjustment target image 121*a* is maintained at a size before the size data is input.

When the size data is input, the image providing device 300 may correct the image data to be transmitted to the projector 10. The image providing device 300 uses the size data to correct the image data. For example, the image providing device 300 adjusts, based on the image data, a size of a partial image in the projection image PG displayed on the projection surface SC. The partial image is an insert image or the like indicating a face or the like of a person. The image providing device 300 can display the size of the partial image in the projection image PG in a size close to an actual size by adjusting the size of the partial image.

Figure 11:
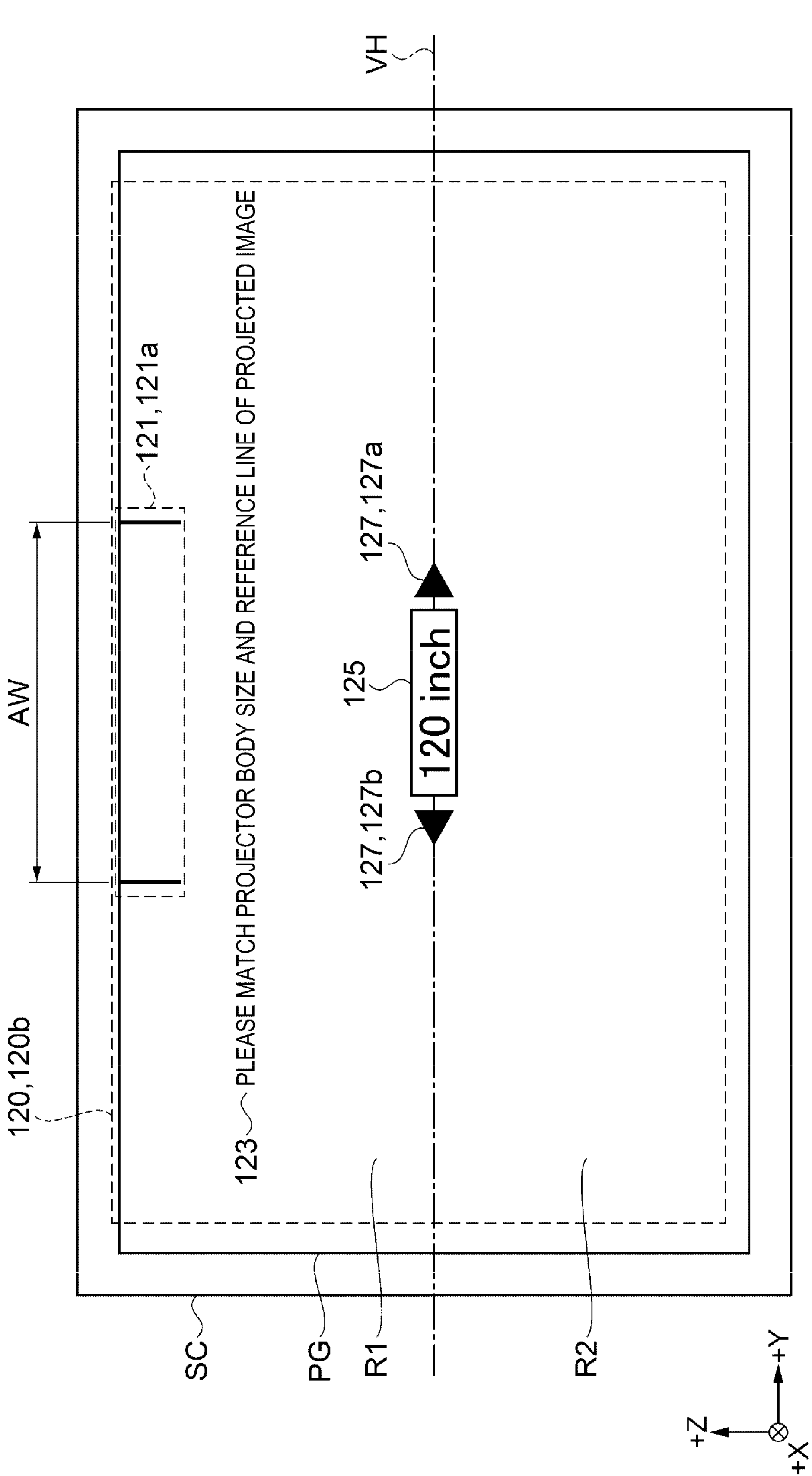
FIG. 11 is a diagram showing the projection image including an adjustment image.

FIG. 11 shows the projection image PG including the adjustment image 120. The projection image PG including the adjustment image 120 is projected onto the projection surface SC by the image projection device 30. FIG. 11 shows a second adjustment image 120*b* as an example of the adjustment image 120. The second adjustment image 120*b* is used when the user M adjusts the adjustment image width AW. The second adjustment image 120*b* is projected into the projection image PG when the second option image 105 is selected by the user M. The second adjustment image 120*b* includes a first adjustment target image 121*a*, an adjustment message image 123, a size display field 125, and an adjustment amount input icon 127. The OSD controller 61 of the controller 60 uses the image projection device 30 to project, onto the projection surface SC, the second adjustment image 120*b* including the first adjustment target image 121*a*, the adjustment message image 123, the size display field 125, and the adjustment amount input icon 127. FIG. 11 shows the virtual horizontal line VH.

The second adjustment image 120*b* has the same configuration as the first adjustment image 120*a* except for a display position of the first adjustment target image 121*a*. The second adjustment image 120*b* is displayed instead of the first adjustment image 120*a*. When the user M performs an input operation on a predetermined button of the plurality of input buttons 205 on the remote control 200, the first adjustment image 120*a* is switched to the second adjustment image 120*b*. The OSD controller 61 may display the second adjustment image 120*b* in the projection image PG instead of the first adjustment image 120*a* in accordance with setting information on the projector 10 stored in the memory 70.

The second adjustment image 120*b* displays the first adjustment target image 121*a* in the first region R1. The first adjustment target image 121*a* is displayed near an upper side of the projection image PG. When the projector 10 is placed above the projection surface SC, the second adjustment image 120*b* is preferably displayed. The display position of the first adjustment target image 121*a* approaches a placement position of the projector 10. The user M can easily compare the adjustment image width AW with the case width PL of the projector 10.

Figure 12:
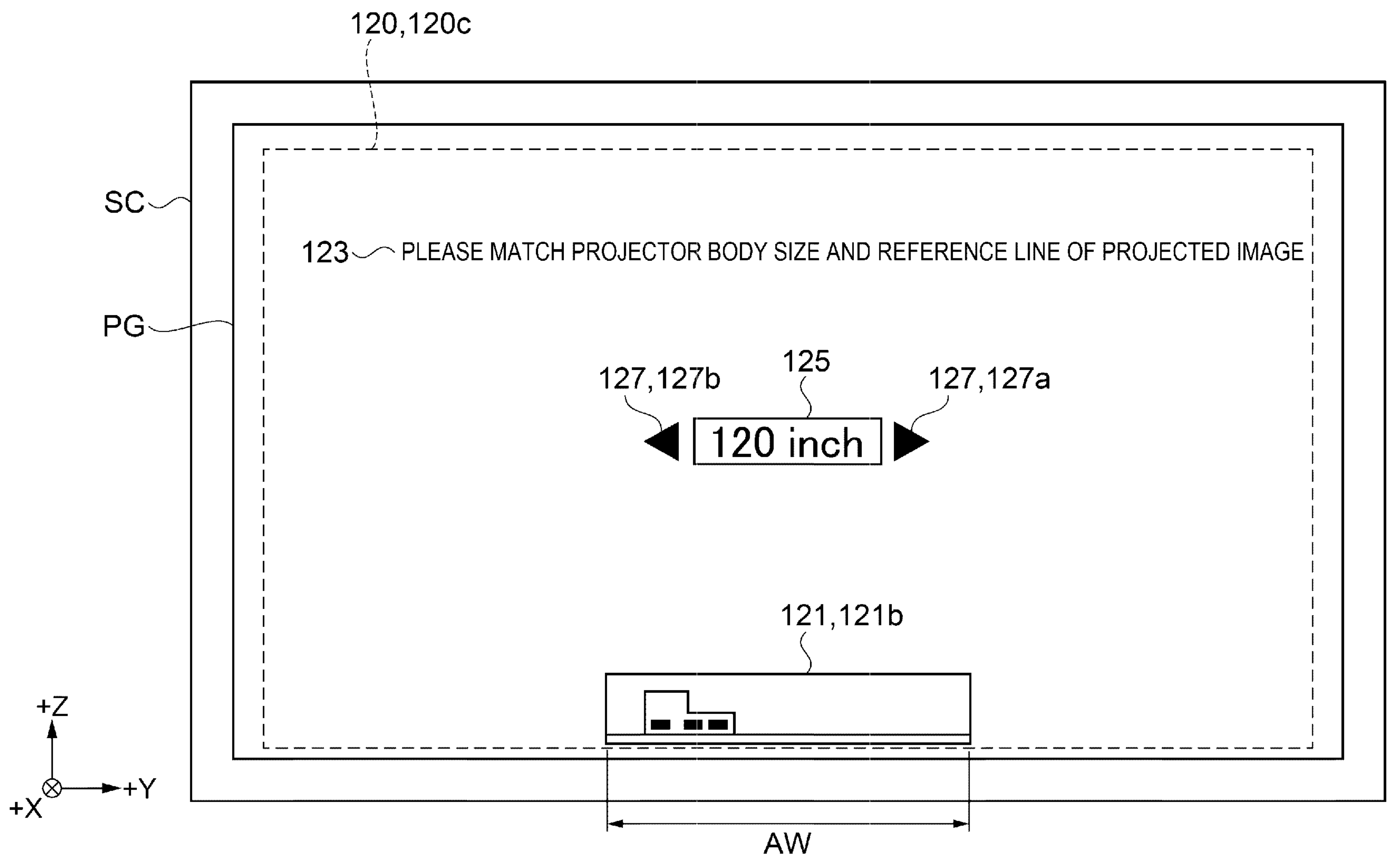
FIG. 12 is a diagram showing the projection image including an adjustment image.

FIG. 12 shows the projection image PG including the adjustment image 120. The projection image PG including the adjustment image 120 is projected onto the projection surface SC by the image projection device 30. FIG. 12 shows a third adjustment image 120*c* as an example of the adjustment image 120. The third adjustment image 120*c* is used when the user M adjusts the adjustment image width AW. The third adjustment image 120*c* is projected into the projection image PG when the second option image 105 is selected by the user M. The third adjustment image 120*c* includes a second adjustment target image 121*b*, the adjustment message image 123, the size display field 125, and the adjustment amount input icon 127. The OSD controller 61 of the controller 60 uses the image projection device 30 to project, onto the projection surface SC, the third adjustment image 120*c* including the second adjustment target image 121*b*, the adjustment message image 123, the size display field 125, and the adjustment amount input icon 127.

The third adjustment image 120*c* is displayed in the projection image PG instead of the first adjustment image 120*a*. The adjustment message image 123, the size display field 125, and the adjustment amount input icon 127 in the third adjustment image 120*c* are the same as the adjustment message image 123, the size display field 125, and the adjustment amount input icon 127 in the first adjustment image 120*a*, respectively.

The second adjustment target image 121*b* is an image different from the first adjustment target image 121*a*. The second adjustment target image 121*b* is an illustration image of the projector 10. A width of the illustration image corresponds to the adjustment image width AW. Since the second adjustment target image 121*b* is the illustration image of the projector 10, the user M can easily understand that the adjustment image width AW and the case width PL are matched.

A shape of the adjustment target image 121 is not limited to the first adjustment target image 121*a* and the second adjustment target image 121*b*. The shape of the adjustment target image 121 is not limited as long as the adjustment image width AW is easily confirmed.

Figure 13:
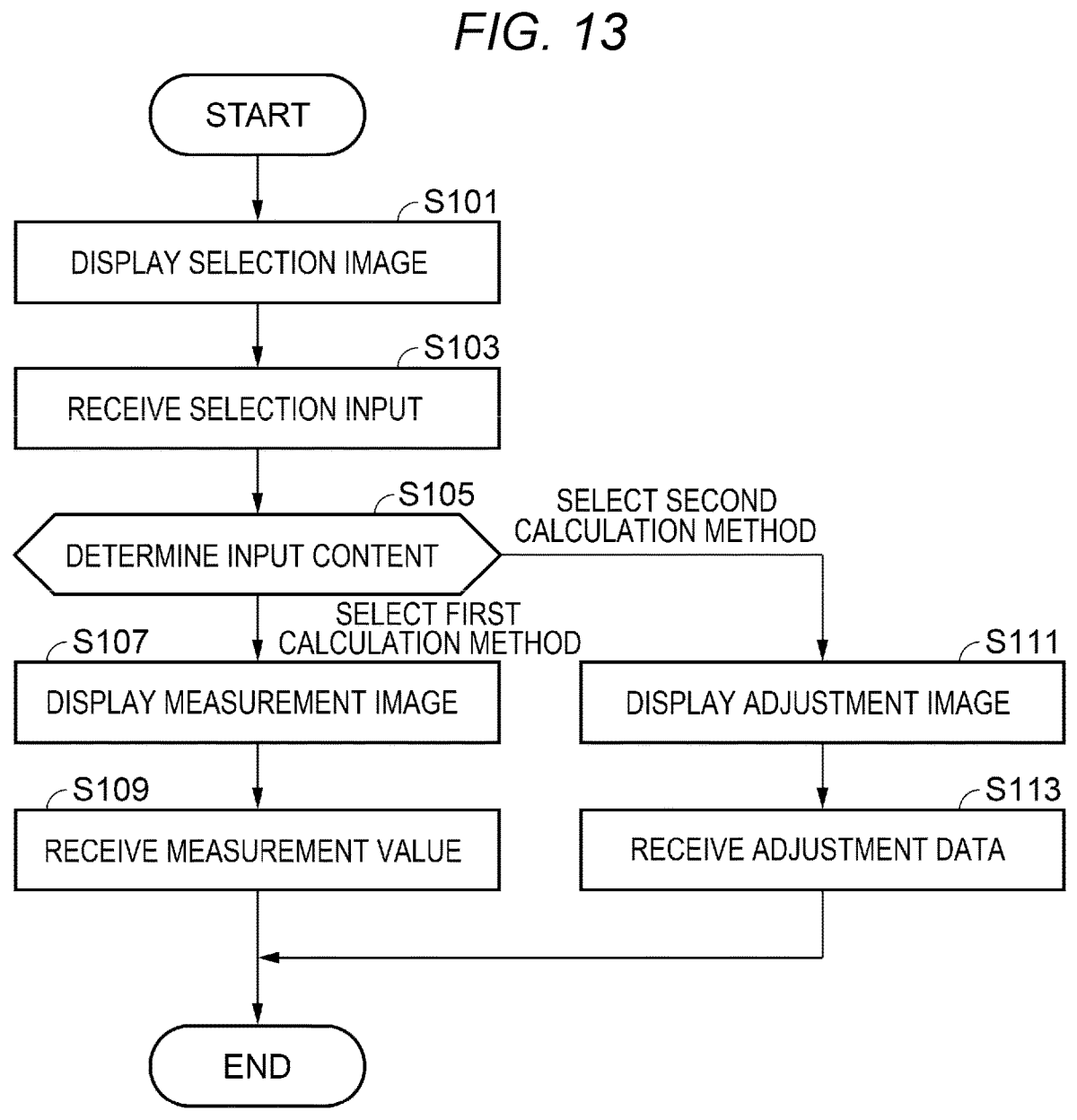

FIG. 13 shows a control flow executed by the projector 10. FIG. 13 shows the control flow when the user M causes the projector 10 to calculate the size data. FIG. 13 is a flowchart showing the control flow. The control flow is executed by the controller 60 of the projector 10 operating the control program CP. The control flow corresponds to an example of a control method.

In step S101, the projector 10 displays the selection image 101. As an example, the OSD controller 61 of the projector 10 uses the image projection device 30 to project the projection image PG including the first selection image 101*a* onto the projection surface SC. When the user M performs a predetermined operation on the setting image 100, the first selection image 101*a* is displayed on the projection surface SC. When the user M turns on the power supply of the projector 10 for the first time, the projection image PG including the first selection image 101*a* may be projected onto the projection surface SC.

After displaying the selection image 101, the projector 10 receives a selection input in step S103. The OSD controller 61 of the projector 10 receives selection of the first option image 103 or the second option image 105. The user M selects the first option image 103 or the second option image 105 by performing an input operation on any of the plurality of assignment buttons 209 on the remote control 200. When the user M performs an input operation on the assignment button 209, the remote control 200 transmits an operation signal to the receiver 90 of the projector 10. The receiver 90 receives the operation signal. The projector 10 receives the selection input by receiving the operation signal.

After receiving the selection input, the projector 10 determines an input content in step S105. The OSD controller 61 determines which of the first option image 103 and the second option image 105 is selected. Upon determining that the first option image 103 is selected, the OSD controller 61 determines that the first calculation method is selected. The projector 10 proceeds to step S107. Upon determining that the second option image 105 is selected, the OSD controller 61 determines that the second calculation method is selected. The projector 10 proceeds to step S111.

When the first calculation method is selected, the projector 10 displays the measurement image 110 in step S107. The OSD controller 61 of the projector 10 uses the image projection device 30 to project the projection image PG including the first measurement image 110*a* onto the projection surface SC. The first measurement image 110*a* includes the first measurement target image 111*a*. The user M can measure the target image length MH of the first measurement target image 111*a*. The OSD controller 61 may display the second measurement image 110*b* instead of the first measurement image 110*a*.

After displaying the measurement image 110, the projector 10 receives a measurement value in step S109. The user M measures the target image length MH of the first measurement target image 111*a* with the ruler 400 or the like. The user M performs an input operation on the remote control 200 to input a measurement value. When the user M inputs the measurement value, the OSD controller 61 receives the measurement value input by the input operation. The OSD controller 61 transmits the measurement value to the data processor 63. The data processor 63 receives the measurement value. The data processor 63 uses the measurement value to calculate the size data by the first calculation method. The data processor 63 transmits the size data to the OSD controller 61, the image controller 65, and the like.

When the second calculation method is selected, the projector 10 displays the adjustment image 120 in step S111. The OSD controller 61 of the projector 10 uses the image projection device 30 to project the projection image PG including the first adjustment image 120*a* onto the projection surface SC. The first adjustment image 120*a* includes the first adjustment target image 121*a*. The user M can change the adjustment image width AW of the first adjustment target image 121*a*. The OSD controller 61 may display the second adjustment image 120*b* or the third adjustment image 120*c* instead of the first adjustment image 120*a*.

After displaying the adjustment image 120, the projector 10 receives the amount of enlargement or the amount of reduction of the adjustment image width AW as the adjustment data in step S113. The user M enlarges or reduces the adjustment image width AW of the first adjustment target image 121*a*. The user M performs an input operation on the remote control 200 to enlarge or reduce the adjustment image width AW. When the user M enlarges or reduces the adjustment image width AW, the OSD controller 61 receives, as the adjustment data, the amount of enlargement or the amount of reduction input by the input operation. The OSD controller 61 transmits the adjustment data to the data processor 63. The data processor 63 receives the adjustment data. The data processor 63 uses the adjustment data to calculate the size data by the second calculation method. The data processor 63 transmits the size data to the OSD controller 61, the image controller 65, and the like.

The projector 10 includes the image projection device 30 configured to emit image light indicating the projection image PG, the controller 60, and the case 11 accommodating the image projection device 30 and the controller 60. The controller 60 displays, on the projection surface SC using the image projection device 30, the first selection image 101*a* for selecting one calculation method of a plurality of calculation methods for determining a size of the projection image PG on the projection surface SC, the plurality of calculation methods including the first calculation method and the second calculation method, displays, on the projection surface SC using the image projection device 30 when the first calculation method is selected, the first measurement target image 111*a* whose target image length MH is to be measured, and displays, on the projection surface SC using the image projection device 30 when the second calculation method is selected, the first adjustment target image 121*a* whose adjustment image width AW is changeable.

The projector 10 can provide the user M with a plurality of calculation methods including the first calculation method and the second calculation method. The user M can select a calculation method according to the usage condition.

The first selection image 101*a* includes the first option image 103 and the second option image 105 indicating each of the plurality of calculation methods.

The user M can select a calculation method by selecting the first option image 103 or the second option image 105.

The first adjustment target image 121*a* is based on the case width PL of the case 11.

When the user M matches or substantially matches the adjustment image width AW with the case width PL, the projector 10 can calculate the size data.

A control flow of the projector 10 includes: displaying, on the projection surface SC from the projector 10, the first selection image 101*a* for selecting one calculation method of a plurality of calculation methods for determining the size of the projection image PG on the projection surface SC, the plurality of calculation methods including the first calculation method and the second calculation method; displaying, on the projection surface SC from the projector 10 when the first calculation method is selected, the first measurement target image 111*a* whose target image length MH is to be measured; and displaying, on the projection surface SC from the projector 10 when the second calculation method is selected, the first adjustment target image 121*a* whose adjustment image width AW is changeable.

The user M can select a calculation method according to the usage condition.

The control program CP causes the projector 10 to display, on the projection surface SC, the first selection image 101*a* for selecting one calculation method of a plurality of calculation methods for determining the size of the projection image PG on the projection surface SC, the plurality of calculation methods including the first calculation method and the second calculation method; display, on the projection surface SC when the first calculation method is selected, the first measurement target image 111*a* whose target image length MH is to be measured; and display, on the projection surface SC when the second calculation method is selected, the first adjustment target image 121*a* whose adjustment image width AW is changeable.

The projector 10 can provide the user M with a plurality of calculation methods including the first calculation method and the second calculation method. The user M can select a calculation method according to the usage condition.

Second Embodiment

A second embodiment shows a method for calculating the size data using the second selection image 101*b*. The second selection image 101*b* is an example of the selection image 101 and is an OSD image. The user M can select one of three calculation methods. The user M can select a calculation method according to a usage condition of the projector 10. The projector 10 can provide a method for calculating the size data according to a situation of the user M. The same components as those of the first embodiment are denoted by the same reference signs, and a detailed description thereof is omitted.

Figure 14:
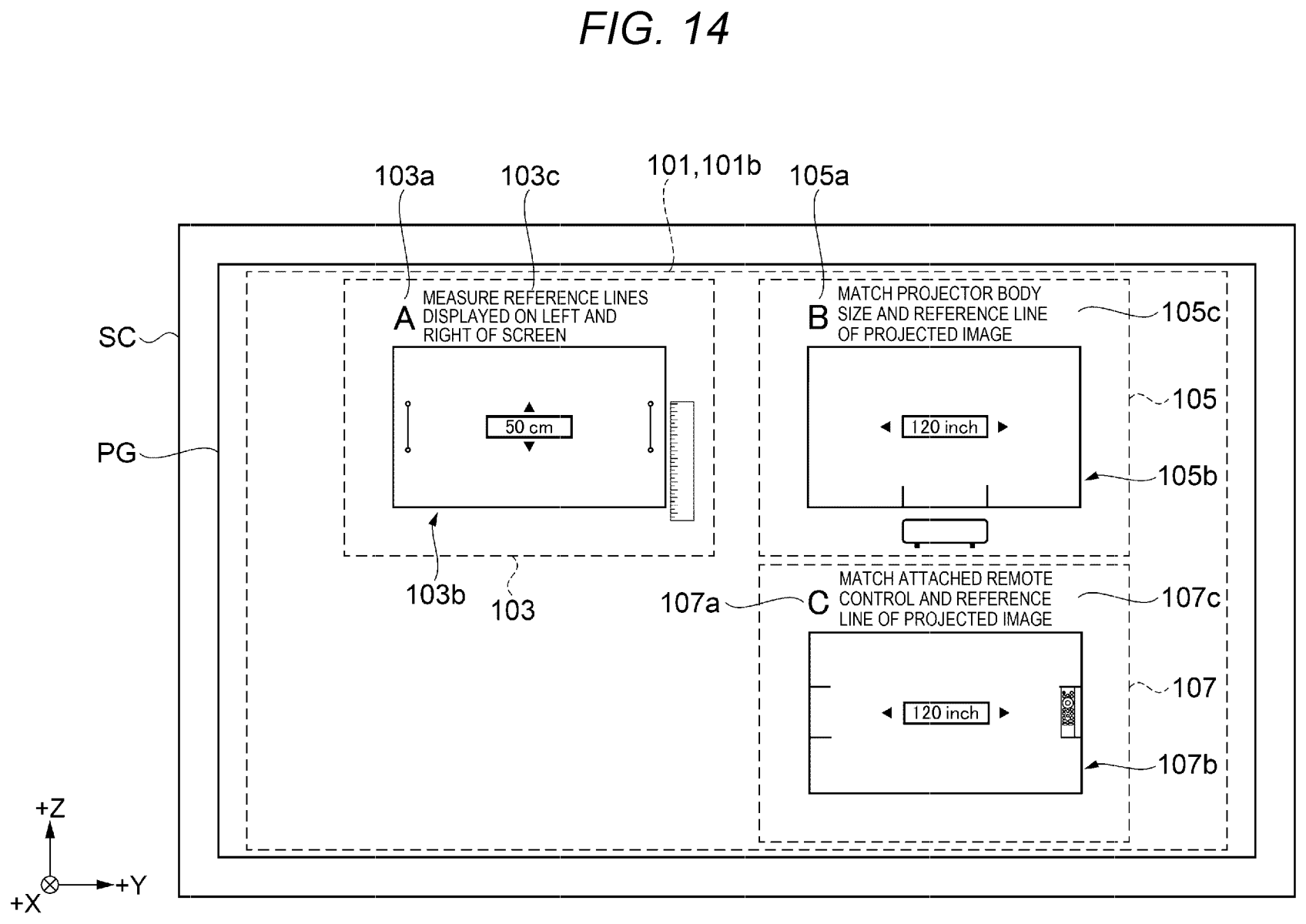

FIG. 14 shows the projection image PG including the selection image 101. FIG. 14 shows the projection image PG including the second selection image 101*b* which is an example of the selection image 101. The second selection image 101*b* is generated by the OSD controller 61 based on the OSD data 71. The projector 10 uses the image projection device 30 to project the projection image PG including the second selection image 101*b* onto the projection surface SC. The second selection image 101*b* is an image for selecting one of the three calculation methods. The second selection image 101*b* includes the first option image 103, the second option image 105, and a third option image 107. The second selection image 101*b* corresponds to an example of the first image.

The first option image 103 and the second option image 105 in the second selection image 101*b* are the same as the first option image 103 and the second option image 105 in the first selection image 101*a*. The second selection image 101*b* includes the third option image 107. An arrangement of the first option image 103, the second option image 105, and the third option image 107 is not limited to an arrangement shown in FIG. 14. The arrangement of the first option image 103, the second option image 105, and the third option image 107 is appropriately set.

The third option image 107 indicates a third calculation method. The third calculation method will be described later. When the user M selects the third option image 107, the third calculation method is selected. The user M can use the operation panel 13 or the remote control 200 to select the third option image 107. The third option image 107 includes a third label image 107*a*, a third illustration image 107*b*, and a third text 107*c*. The third option image 107 corresponds to an example of the fourth image.

The third label image 107*a* is a label indicating the third option image 107. The third label image 107*a* is referred to when the user M uses the assignment button 209. The third label image 107*a* displays a symbol. The third label image 107*a* shown in FIG. 14 indicates a third symbol C. The third symbol C corresponds to the third assignment button 209*c*. When selecting the third option image 107, the user M performs an input operation on the third assignment button 209*c*. When the input operation is performed on the third assignment button 209*c*, the third calculation method corresponding to the third option image 107 is selected.

The third illustration image 107*b* shows a method for acquiring the adjustment data used in the third calculation method. The third illustration image 107*b* shows a vertical width adjustment image 130 and an illustration image of the remote control 200, which will be described later. The illustration image of the remote control 200 represents an object that is the adjustment target. The user M can confirm the method for acquiring the adjustment data by visually recognizing the third illustration image 107*b*.

The third text 107*c* indicates a method for acquiring the adjustment data used in the third calculation method by text. The third text 107*c* indicates an instruction to match the remote control width RL of the remote control 200 with the width of the reference line. The user M can confirm a method for measuring measurement data by visually recognizing the third text 107*c*.

The third option image 107 shown in FIG. 14 includes the third illustration image 107*b* and the third text 107*c*, but is not limited thereto. The third option image 107 may include either the third illustration image 107*b* or the third text 107*c*.

When the user M selects the first option image 103 shown in FIG. 14, the first calculation method is selected. The projector 10 uses the image projection device 30 to project the projection image PG including the measurement image 110 onto the projection surface SC. The projector 10 projects the projection image PG including the first measurement image 110*a* shown in FIG. 7 or the second measurement image 110*b* shown in FIG. 9 onto the projection surface SC. The user M measures the target image length MH of the measurement target image 111 in the measurement image 110. The user M inputs a measurement value to the projector 10. The projector 10 uses the measurement value to calculate the size data.

When the user M selects the second option image 105 shown in FIG. 14, the second calculation method is selected. The projector 10 uses the image projection device 30 to project the projection image PG including the adjustment image 120 onto the projection surface SC. The projector 10 projects, onto the projection surface SC, the projection image PG including any one of the first adjustment image 120*a* shown in FIG. 10, the second adjustment image 120*b* shown in FIG. 11, and the third adjustment image 120*c* shown in FIG. 12. The user M adjusts the adjustment image width AW of the adjustment image 120. When the user M adjusts the adjustment image width AW, the projector 10 calculates the size data based on the adjustment data.

When the user M selects the third option image 107 shown in FIG. 14, the third calculation method is selected. The third calculation method corresponds to an example of a third method. The projector 10 projects, onto the projection surface SC, the projection image PG including the vertical width adjustment image 130 according to the third calculation method.

Figure 15:
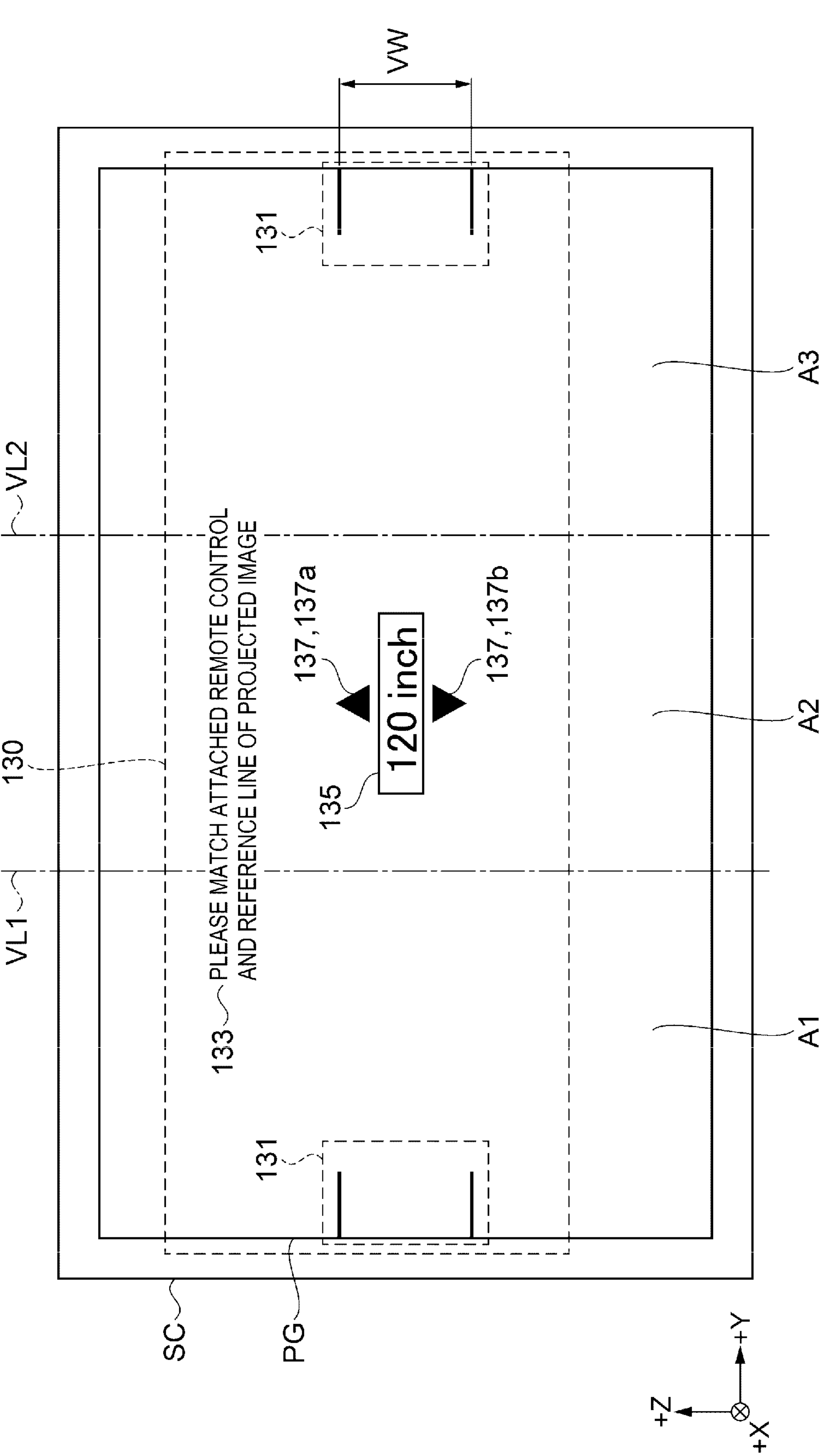
FIG. 15 is a diagram showing the projection image including a vertical width adjustment image.

FIG. 15 shows the projection image PG including the vertical width adjustment image 130. The projection image PG including the vertical width adjustment image 130 is projected onto the projection surface SC by the image projection device 30. The vertical width adjustment image 130 is used when the user M adjusts a vertical width VW. The vertical width adjustment image 130 is projected into the projection image PG when the third option image 107 is selected by the user M. The vertical width adjustment image 130 is an image according to the third calculation method. The vertical width adjustment image 130 includes a vertical width adjustment target image 131, a vertical width adjustment message image 133, an image size display field 135, and an adjustment icon 137. The OSD controller 61 of the controller 60 uses the image projection device 30 to project, onto the projection surface SC, the vertical width adjustment image 130 including the vertical width adjustment target image 131, the vertical width adjustment message image 133, the image size display field 135, and the adjustment icon 137. FIG. 15 shows the first virtual line VL1 and the second virtual line VL2.

The vertical width adjustment target image 131 is an image that allows the user M to adjust the vertical width VW. The vertical width adjustment target image 131 shown in FIG. 15 includes two line images. A width along the Z axis between the two line images corresponds to the vertical width VW. The two vertical width adjustment target images 131 shown in FIG. 15 are displayed in the first divided region A1 and the third divided region A3 of the projection image PG. The vertical width adjustment target image 131 is preferably displayed in the first divided region A1 or in the third divided region A3. The user M can easily adjust the vertical width VW to a size of the object. The vertical width adjustment target image 131 shown in FIG. 15 includes two line images, but is not limited thereto. The vertical width adjustment target image 131 may be an illustration image of an object or the like. The number of vertical width adjustment target images 131 is not limited to two. The number of vertical width adjustment target images 131 may be one or three or more. The vertical width adjustment target image 131 corresponds to an example of a seventh image.

The vertical width VW of the vertical width adjustment target image 131 can be changed by the user M. The vertical width VW of the vertical width adjustment target image 131 is enlarged or reduced by an input operation of the user M. When the user M performs an input operation on the operation panel 13 or on the remote control 200, the vertical width VW is enlarged or reduced. The user M enlarges or reduces the vertical width VW to match or substantially match the vertical width VW and the width of the object. The vertical width VW corresponds to an example of an image width.

The object with respect to the vertical width VW is the remote control 200 attached to the projector 10 or a jig attached to the projector 10. The object corresponding to the vertical width VW is preferably the remote control 200. The remote control 200 is likely to be disposed in the vicinity of the projector 10. The user M can easily prepare the remote control 200 as the object. The object is preferably smaller than the case 11 of the projector 10. The user M can easily move the object to a vicinity of the vertical width adjustment target image 131. When the object is smaller than the case 11 of the projector 10, the vertical width adjustment target image 131 is smaller than the adjustment target image 121 shown in FIG. 10 and the like. The user M can easily compare the vertical width adjustment target image 131 with the object.

The vertical width adjustment message image 133 is an image for displaying information to be notified to the user M. The vertical width adjustment message image 133 is a message prompting the user M to adjust the vertical width VW. In the vertical width adjustment message image 133, the object is the remote control 200. The vertical width adjustment message image 133 represents the vertical width adjustment target image 131 as the reference line. The vertical width adjustment message image 133 is a message for requesting the user M to match the vertical width VW with the remote control width RL of the remote control 200. A content of the vertical width adjustment message image 133 is appropriately set.

The image size display field 135 displays the size of the projection image PG corresponding to the vertical width VW. The image size display field 135 displays the diagonal line length Y which is an example of the size of the projection image PG. When the user M changes the vertical width VW, the size of the projection image PG corresponding to the changed vertical width VW is displayed. The image size display field 135 shown in FIG. 15 displays the size value in units of inches, but is not limited thereto. A unit of the size value is appropriately set.

The adjustment icon 137 is referred to when the user M adjusts the vertical width VW. The adjustment icon 137 corresponds to a part of the up, down, left, and right buttons 203 on the remote control 200. When the operation panel 13 has a direction instruction button in the operation button 15 similar to the up, down, left, and right buttons 203, the adjustment icon 137 corresponds to the direction instruction button. The adjustment icon 137 includes a first adjustment icon 137*a* and a second adjustment icon 137*b*.

The first adjustment icon 137*a* corresponds to the up button in the up, down, left, and right buttons 203. The first adjustment icon 137*a* indicates to the user M that the up button can be used for an input operation. When the user M performs the input operation on the up button, the vertical width VW of the vertical width adjustment target image 131 is enlarged.

The second adjustment icon 137*b* corresponds to the down button in the up, down, left, and right buttons 203. The second adjustment icon 137*b* indicates to the user M that the down button can be used for an input operation. When the user M performs the input operation on the down button, the vertical width VW of the vertical width adjustment target image 131 is reduced. The user M adjusts the vertical width VW by performing an input operation on the up button or on the down button.

The projector 10 can calculate the size data by the third calculation method by projecting the projection image PG including the vertical width adjustment image 130 onto the projection surface SC. The projector 10 allows the user M to adjust the vertical width VW of the vertical width adjustment target image 131. When the user M adjusts the vertical width VW, the projector 10 calculates size data. The third calculation method is a method for calculating the size data using the vertical width adjustment target image 131.

As an example, the user M matches or substantially matches the vertical width VW with the remote control width RL of the remote control 200. The user M enlarges or reduces the vertical width VW to match or substantially match the vertical width VW and the remote control width RL. When the user M enlarges or reduces the vertical width VW, the OSD controller 61 outputs vertical width ratio data corresponding to an amount of enlargement or an amount of reduction of the vertical width VW. The amount of enlargement or the amount of reduction is an example of vertical width adjustment data. The vertical width ratio data is an example of third ratio data. The vertical width ratio data is a width ratio of the vertical width VW to the projection image height PH of the projection image PG. A relationship between the vertical width VW and the vertical width ratio data is set in advance and stored in the memory 70. When the vertical width VW matches the remote control width RL, the vertical width ratio data is set as reference vertical width ratio data, which is a value that is a preset size of the projection image PG. As an example, the vertical width ratio data is set in advance to a value at which the diagonal line length Y is 120 inches when the vertical width VW matches the remote control width RL. The OSD controller 61 transmits the vertical width ratio data corresponding to the amount of enlargement or the amount of reduction to the data processor 63.

The data processor 63 receives the vertical width ratio data corresponding to the amount of enlargement or the amount of reduction. The data processor 63 calculates the diagonal line length Y, which is an example of the size data, using the following formula (3).

$$Y = \sqrt{(c_3 X)^2 \times \left(1 + \left(\frac{a}{b}\right)^2\right)} \tag{3}$$

Here, $c_3$ is the third ratio data. X is a reference value. The reference value is an actual size value of the remote control width RL of the remote control 200. The vertical width VW is set based on the remote control width RL. The actual size value of the remote control width RL is stored in the memory 70 in advance as the reference value. a and b are values representing the aspect ratio. The data processor 63 can calculate the diagonal line length Y by substituting the vertical width ratio data corresponding to the vertical width adjustment data into formula (3). The data processor 63 outputs the diagonal line length Y as the size data to the OSD controller 61, the image providing device 300, and the like.

When the size data is input, the OSD controller 61 adjusts the sizes of various images in the OSD image. The OSD controller 61 adjusts sizes of the images other than the vertical width adjustment target image 131, such as the vertical width adjustment message image 133 and the image size display field 135, based on the size data. The OSD controller 61 adjusts the size of the setting image 100 as an example. By adjusting the size of the setting image 100 based on the size data, the user M can easily visually recognize the setting image 100. The size of the vertical width adjustment target image 131 is maintained at a size before the size data is input.

When the size data is input, the image providing device 300 may correct the image data to be transmitted to the projector 10. The image providing device 300 uses the size data to correct the image data. For example, the image providing device 300 adjusts, based on the image data, a size of a partial image in the projection image PG displayed on the projection surface SC. The partial image is an insert image or the like indicating a face or the like of a person. The image providing device 300 can display the size of the partial image in the projection image PG in a size close to an actual size by adjusting the size of the partial image.

FIG. 16 shows a control flow executed by the projector 10. FIG. 16 shows the control flow when the user M causes the projector 10 to calculate the size data. FIG. 16 is a flowchart showing the control flow. The control flow is executed by the controller 60 of the projector 10 operating the control program CP.

In step S201, the projector 10 displays the selection image 101. As an example, the OSD controller 61 of the projector 10 uses the image projection device 30 to project the projection image PG including the first selection image 101*a* onto the projection surface SC. When the user M performs a predetermined operation on the setting image 100, the first selection image 101*a* is displayed on the projection surface SC. When the user M turns on the power supply of the projector 10 for the first time, the projection image PG including the first selection image 101*a* may be projected onto the projection surface SC.

After displaying the selection image 101, the projector 10 receives a selection input in step S203. The OSD controller 61 of the projector 10 receives selection of any one of the first option image 103, the second option image 105, and the third option image 107. The user M selects any one of the first option image 103, the second option image 105, and the third option image 107 by performing an input operation on any one of the plurality of assignment buttons 209 on the remote control 200. When the user M performs an input operation on the assignment button 209, the remote control 200 transmits an operation signal to the receiver 90 of the projector 10. The receiver 90 receives the operation signal. The projector 10 receives the selection input by receiving the operation signal.

After receiving the selection input, the projector 10 determines an input content in step S205. The OSD controller 61 determines which of the first option image 103, the second option image 105, and the third option image 107 is selected. Upon determining that the first option image 103 is selected, the OSD controller 61 determines that the first calculation method is selected. The projector 10 proceeds to step S207. Upon determining that the second option image 105 is selected, the OSD controller 61 determines that the second calculation method is selected. The projector 10 proceeds to step S211. Upon determining that the third option image 107 is selected, the OSD controller 61 determines that the third calculation method is selected. The projector 10 proceeds to step S215.

When the first calculation method is selected, the projector 10 displays the measurement image 110 in step S207. The OSD controller 61 of the projector 10 uses the image projection device 30 to project the projection image PG including the first measurement image 110*a* onto the projection surface SC. The first measurement image 110*a* includes the first measurement target image 111*a*. The user M can measure the target image length MH of the first measurement target image 111*a*. The OSD controller 61 may display the second measurement image 110*b* instead of the first measurement image 110*a*.

After displaying the measurement image 110, the projector 10 receives a measurement value in step S209. The user M measures the target image length MH of the first measurement target image 111*a* with the ruler 400 or the like. The user M performs an input operation on the remote control 200 to input a measurement value. When the user M inputs the measurement value, the OSD controller 61 receives the measurement value input by the input operation. The OSD controller 61 transmits the measurement value to the data processor 63. The data processor 63 receives the measurement value. The data processor 63 uses the measurement value to calculate the size data by the first calculation method. The data processor 63 transmits the size data to the OSD controller 61, the image controller 65, and the like.

When the second calculation method is selected, the projector 10 displays the adjustment image 120 in step S211. The OSD controller 61 of the projector 10 uses the image projection device 30 to project the projection image PG including the first adjustment image 120*a* onto the projection surface SC. The first adjustment image 120*a* includes the first adjustment target image 121*a*. The user M can change the adjustment image width AW of the first adjustment target image 121*a*. The OSD controller 61 may display the second adjustment image 120*b* or the third adjustment image 120*c* instead of the first adjustment image 120*a*.

After displaying the adjustment image 120, the projector 10 receives the amount of enlargement or the amount of reduction of the adjustment image width AW as the adjustment data in step S213. The user M enlarges or reduces the adjustment image width AW of the first adjustment target image 121*a*. The user M performs an input operation on the remote control 200 to enlarge or reduce the adjustment image width AW. When the user M enlarges or reduces the adjustment image width AW, the OSD controller 61 receives, as the adjustment data, the amount of enlargement or the amount of reduction input by the input operation. The OSD controller 61 transmits the adjustment data to the data processor 63. The data processor 63 receives the adjustment data. The data processor 63 uses the adjustment data to calculate the size data by the second calculation method. The data processor 63 transmits the size data to the OSD controller 61, the image controller 65, and the like.

When the third calculation method is selected, the projector 10 displays the vertical width adjustment image 130 in step S215. The OSD controller 61 of the projector 10 uses the image projection device 30 to project the projection image PG including the vertical width adjustment image 130 onto the projection surface SC. The vertical width adjustment image 130 includes the vertical width adjustment target image 131. The user M can change the vertical width VW of the vertical width adjustment target image 131.

After displaying the vertical width adjustment image 130, the projector 10 receives the amount of enlargement or the amount of reduction of the vertical width VW as the vertical width adjustment data in step S217. The user M enlarges or reduces the vertical width VW of the vertical width adjustment target image 131. The user M performs an input operation on the remote control 200 to enlarge or reduce the vertical width VW. When the user M enlarges or reduces the vertical width VW, the OSD controller 61 receives, as the vertical width adjustment data, the amount of enlargement or the amount of reduction input by the input operation. The OSD controller 61 transmits the vertical width adjustment data to the data processor 63. The data processor 63 receives the vertical width adjustment data. The data processor 63 uses the vertical width adjustment data to calculate the size data by the third calculation method. The data processor 63 transmits the size data to the OSD controller 61, the image controller 65, and the like.

In the second embodiment, the method for calculating the size data in which the object is the case 11 of the projector 10 is the second calculation method, and the method for calculating the size data in which the object is the remote control 200 is the third calculation method, but the method is not limited thereto. The method for calculating the size data in which the object is the remote control 200 may be the second calculation method, and the method for calculating the size data in which the object is the case 11 of the projector 10 may be the third calculation method. When the method for calculating the size data in which the object is the remote control 200 is the second calculation method, the vertical width adjustment target image 131 corresponds to an example of the third image. The vertical width VW corresponds to an example of the width.

The vertical width VW of the vertical width adjustment target image 131 is based on the remote control width RL of the remote control 200.

When the user M matches or substantially matches the vertical width VW with the remote control width RL, the projector 10 can calculate the size data.

Third Embodiment

A third embodiment shows a method for calculating the size data using a third selection image 101*c*. The third selection image 101*c* is an example of the selection image 101 and is an OSD image. The user M can select one of the two calculation methods. The user M can select a calculation method based on presence or absence of the measuring instrument. The user M can select a calculation method according to a usage condition of the projector 10. The projector 10 can provide a method for calculating the size data according to a situation of the user M. The same components as those of the first embodiment and the second embodiment are denoted by the same reference signs, and a detailed description thereof is omitted.

FIG. 17 shows the projection image PG including the selection image 101. FIG. 17 shows the projection image PG including the third selection image 101*c* which is an example of the selection image 101. The third selection image 101*c* is generated by the OSD controller 61 based on the OSD data 71. The projector 10 uses the image projection device 30 to project the projection image PG including the third selection image 101*c* onto the projection surface SC. The third selection image 101*c* is an image for selecting one of the two calculation methods. The third selection image 101*c* includes the first option image 103, the second option image 105, and an instrument confirmation icon 141. The third selection image 101*c* corresponds to an example of the first image.

The first option image 103 shown in FIG. 17 is the same as the first option image 103 shown in FIG. 6 except for a display position in the projection image PG. The second option image 105 shown in FIG. 17 is the same as the second option image 105 shown in FIG. 6 except for a display position in the projection image PG.

The instrument confirmation icon 141 is an image that is referred to when the user M inputs a confirmation result as to whether the user M has a measuring instrument. The instrument confirmation icon 141 includes a first instrument confirmation icon 141*a* and a second instrument confirmation icon 141*b*. The instrument confirmation icon 141 corresponds to an example of a fifth image.

The first instrument confirmation icon 141*a* indicates that the user M has a measuring instrument. The first instrument confirmation icon 141*a* corresponds to a predetermined input button 205 on the remote control 200. When the user M performs an input operation on the corresponding predetermined input button 205, the remote control 200 transmits, to the projector 10, an operation signal indicating that there is a measuring instrument. The receiver 90 of the projector 10 receives the operation signal. The receiver 90 transmits the operation signal to the OSD controller 61. Upon receiving the operation signal, the OSD controller 61 determines that the user M has a measuring instrument. The OSD controller 61 determines that the first calculation method is selected. The OSD controller 61 projects the projection image PG including the measurement image 110 onto the projection surface SC. The user M can measure the target image length MH of the measurement target image 111. The projector 10 can calculate the size data by the first calculation method using the measurement value.

The second instrument confirmation icon 141*b* indicates that the user M does not have a measuring instrument. The second instrument confirmation icon 141*b* corresponds to a predetermined input button 205 on the remote control 200. When the user M performs an input operation on the corresponding predetermined input button 205, the remote control 200 transmits, to the projector 10, an operation signal indicating that there is no measuring instrument. The receiver 90 of the projector 10 receives the operation signal. The receiver 90 transmits the operation signal to the OSD controller 61. Upon receiving the operation signal, the OSD controller 61 determines that the user M does not have a measuring instrument. The OSD controller 61 determines that the second calculation method is selected. The OSD controller 61 projects the projection image PG including the adjustment image 120 onto the projection surface SC. The user M can change the adjustment image width AW of the adjustment target image 121. The user M enlarges or reduces the adjustment image width AW. When the user M enlarges or reduces the adjustment image width AW, the OSD controller 61 transmits the adjustment data to the data processor 63. The data processor 63 calculates size data based on the adjustment data. The projector 10 can calculate the size data by the second calculation method using the adjustment data.

The third selection image 101*c* includes the instrument confirmation icon 141 for selecting whether there is a measuring instrument.

The user M can perform an input operation indicating that there is a measuring instrument or an input operation indicating that there is no measuring instrument. The user M can select a calculation method according to presence or absence of the measuring instrument by performing an input operation.

The controller 60 selects the first calculation method when it is selected that there is a measuring instrument.

When there is a measuring instrument, the user M can cause the projector 10 to project the projection image PG including the measurement image 110.

When it is selected that there is no measuring instrument, the controller 60 selects the second calculation method.

When there is no measuring instrument, the user M can cause the projector 10 to project the projection image PG including the adjustment image 120.

Fourth Embodiment

A fourth embodiment shows a method for calculating the size data using a fourth selection image 101*d*. The fourth selection image 101*d* is an example of the selection image 101 and is an OSD image. The user M can select one of three calculation methods. The user M can select a calculation method based on presence or absence of a measuring instrument and a distance between the projector 10 and the projection surface SC. The user M can select a calculation method according to a usage condition of the projector 10. The projector 10 can provide a method for calculating the size data according to a situation of the user M. The same components as those of the first embodiment, the second embodiment, and the third embodiment are denoted by the same reference signs, and a detailed description thereof is omitted.

Figure 18:
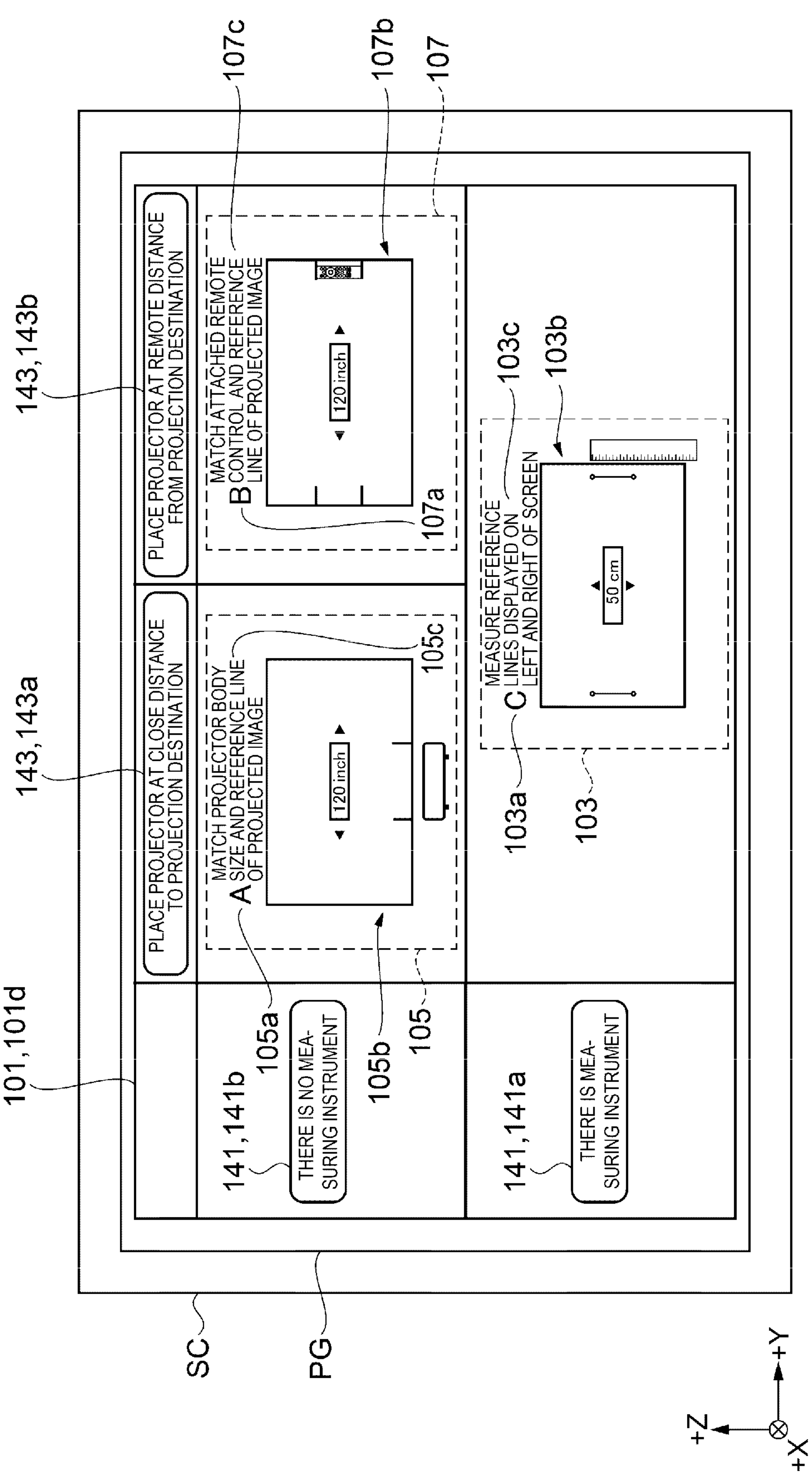
FIG. 18 is a diagram showing a projection image including a selection image.

FIG. 18 shows the projection image PG including the selection image 101. FIG. 18 shows the projection image PG including the fourth selection image 101*d* which is an example of the selection image 101. The fourth selection image 101*d* is generated by the OSD controller 61 based on the OSD data 71. The projector 10 uses the image projection device 30 to project the projection image PG including the fourth selection image 101*d* onto the projection surface SC. The fourth selection image 101*d* is an image for selecting one of the three calculation methods. The fourth selection image 101*d* includes the first option image 103, the second option image 105, the third option image 107, the instrument confirmation icon 141, and a distance confirmation icon 143. The fourth selection image 101*d* corresponds to an example of the first image.

The first option image 103 shown in FIG. 18 is the same as the first option image 103 shown in FIG. 14 except for a display content of the first label image 103*a*. The first label image 103*a* shown in FIG. 18 indicates the third symbol C. The third symbol C corresponds to the third assignment button 209*c*. When selecting the first option image 103, the user M performs an input operation on the third assignment button 209*c*. When the input operation is performed on the third assignment button 209*c*, the first calculation method corresponding to the first option image 103 is selected. The display content of the first label image 103*a* is appropriately changed according to a display position of the first option image 103. The first label image 103*a* may display the same symbol regardless of the display position of the first option image 103. The display content of the first label image 103*a* is not limited as long as the display content is different from display contents of the second label image 105*a* and the third label image 107*a*.

The second option image 105 shown in FIG. 18 is the same as the second option image 105 shown in FIG. 14 except for the display content of the second label image 105*a*. The second label image 105*a* shown in FIG. 18 indicates the first symbol A. The first symbol A corresponds to the first assignment button 209*a*. When selecting the second option image 105, the user M performs an input operation on the first assignment button 209*a*. When the input operation is performed on the first assignment button 209*a*, the second calculation method corresponding to the second option image 105 is selected. The display content of the second label image 105*a* is appropriately changed according to a display position of the second option image 105. The second label image 105*a* may display the same symbol regardless of the display position of the second option image 105. The display content of the second label image 105*a* is not limited as long as the display content is different from display contents of the first label image 103*a* and the third label image 107*a*.

The third option image 107 shown in FIG. 18 is the same as the third option image 107 shown in FIG. 14 except for the display content of the third label image 107*a*. The third label image 107*a* shown in FIG. 18 indicates the second symbol B. The second symbol B corresponds to the second assignment button 209*b*. When selecting the third option image 107, the user M performs an input operation on the second assignment button 209*b*. When the input operation is performed on the second assignment button 209*b*, the third calculation method corresponding to the third option image 107 is selected. The display content of the third label image 107*a* is appropriately changed according to a display position of the third option image 107. The third label image 107*a* may display the same symbol regardless of the display position of the third option image 107. The display content of the third label image 107*a* is not limited as long as the display content is different from display contents of the first label image 103*a* and the second label image 105*a*.

The instrument confirmation icon 141 is an image that is referred to when the user M inputs a confirmation result as to whether the user M has a measuring instrument. The instrument confirmation icon 141 includes a first instrument confirmation icon 141*a* and a second instrument confirmation icon 141*b*. The first instrument confirmation icon 141*a* indicates that the user M has a measuring instrument. The second instrument confirmation icon 141*b* indicates that the user M does not have a measuring instrument. Each of the first instrument confirmation icon 141*a* and the second instrument confirmation icon 141*b* corresponds to one of the plurality of input buttons 205 disposed on the remote control 200.

The distance confirmation icon 143 is an image that is referred to when the user M inputs a confirmation result of a separation distance between the projector 10 and the projection surface SC. The distance confirmation icon 143 allows the user M to select a length of a separation distance between the case 11 and the projection surface SC. The distance confirmation icon 143 includes a first distance confirmation icon 143*a* and a second distance confirmation icon 143*b*. Each of the first distance confirmation icon 143*a* and the second distance confirmation icon 143*b* corresponds to one of the plurality of input buttons 205 disposed on the remote control 200. The user M performs an input operation on the input button 205 corresponding to the first distance confirmation icon 143*a* or the second distance confirmation icon 143*b* according to the separation distance. The distance confirmation icon 143 corresponds to an example of a sixth image.

The first distance confirmation icon 143*a* indicates that the separation distance between the projector 10 and the projection surface SC is a close distance. The close distance is, for example, a separation distance between the projector 10 and the projection surface SC of less than 1 m. When the projector 10 is a short focus projector, the projector 10 is disposed at a close distance of 50 cm or less. Upon determining that the separation distance between the projector 10 and the projection surface SC is a close distance, the user M performs an input operation on the input button 205 corresponding to the first distance confirmation icon 143*a*.

The second distance confirmation icon 143*b* indicates that the separation distance between the projector 10 and the projection surface SC is a remote distance. The remote distance is, for example, a separation distance between the projector 10 and the projection surface SC of 1 m or more. Upon determining that the separation distance between the projector 10 and the projection surface SC is a remote distance, the user M performs an input operation on the input button 205 corresponding to the second distance confirmation icon 143*b*.

The user M can perform an input operation on the input button 205 corresponding to any one of the first instrument confirmation icon 141*a*, the second instrument confirmation icon 141*b*, the first distance confirmation icon 143*a*, and the second distance confirmation icon 143*b*. When the user M performs an input operation on the input button 205 corresponding to the first instrument confirmation icon 141*a*, the controller 60 projects the projection image PG including the measurement image 110 onto the projection surface SC. When the user M performs an input operation on the input button 205 corresponding to the second instrument confirmation icon 141*b*, the controller 60 projects the projection image PG including a first sub-selection image 102*a* onto the projection surface SC. When the user M performs an input operation on the input button 205 corresponding to the first distance confirmation icon 143*a*, the controller 60 projects the projection image PG including a second sub-selection image 102*b* onto the projection surface SC. When the user M performs an input operation on the input button 205 corresponding to the second distance confirmation icon 143*b*, the controller 60 projects the projection image PG including a third sub-selection image 102*c* onto the projection surface SC.

The fourth selection image 101*d* includes, but is not limited to, the first option image 103, the second option image 105, and the third option image 107. The fourth selection image 101*d* may not include the first option image 103, the second option image 105, and the third option image 107. The fourth selection image 101*d* may include the instrument confirmation icon 141 and the distance confirmation icon 143.

Figure 19:
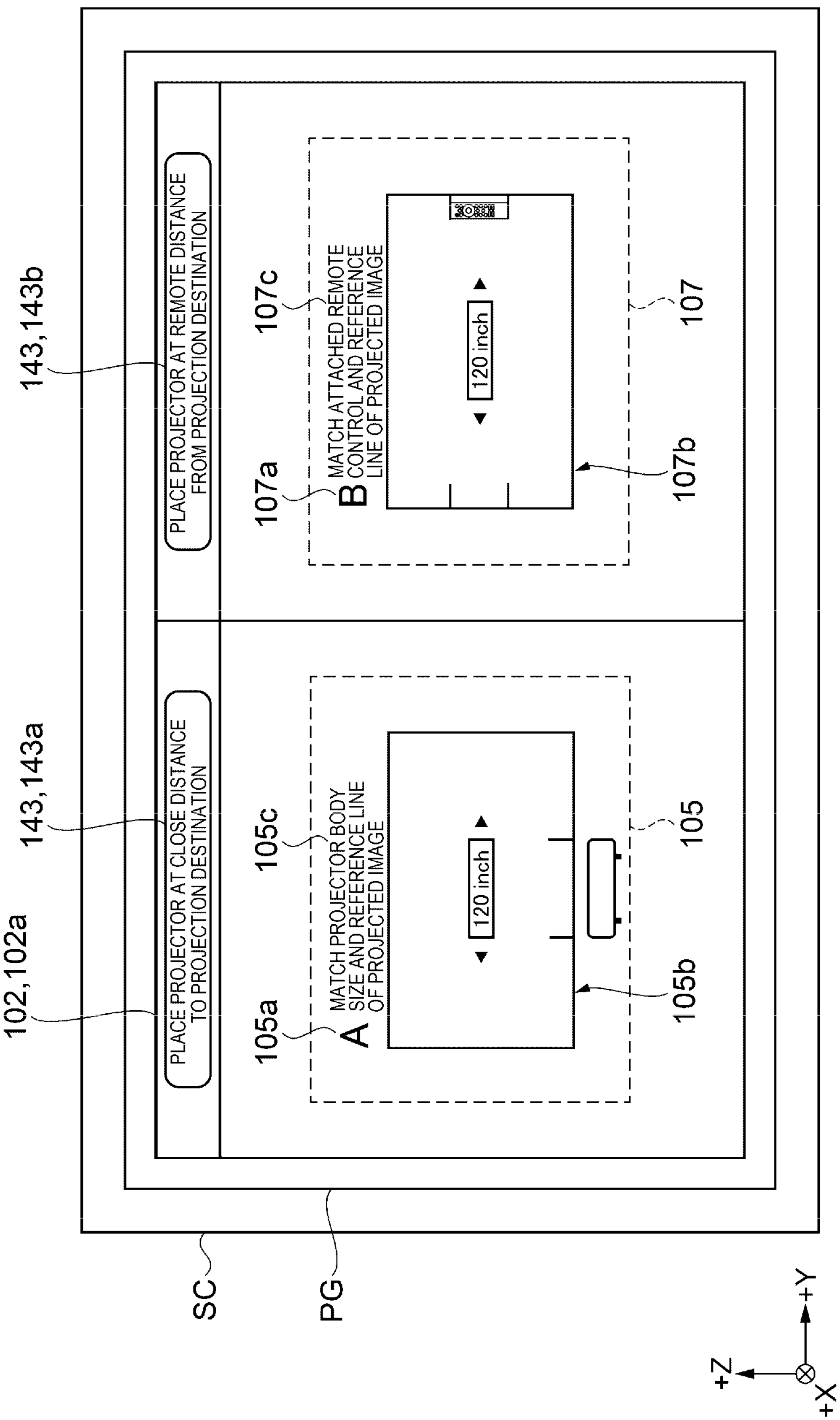
FIG. 19 is a diagram showing the projection image including a sub-selection image.

FIG. 19 shows the projection image PG including a sub-selection image 102. FIG. 19 shows the projection image PG including the first sub-selection image 102*a* which is an example of the sub-selection image 102. The first sub-selection image 102*a* is generated by the OSD controller 61 based on the OSD data 71. The projector 10 uses the image projection device 30 to project the projection image PG including the first sub-selection image 102*a* onto the projection surface SC.

The first sub-selection image 102*a* is displayed when the user M performs an input operation on the input button 205 corresponding to the second instrument confirmation icon 141*b* in the fourth selection image 101*d* shown in FIG. 18. The first sub-selection image 102*a* is displayed when the user M makes a selection that there is no measuring instrument. The controller 60 displays the first sub-selection image 102*a* when it is selected that there is no measuring instrument. The first sub-selection image 102*a* includes the second option image 105, the third option image 107, and the distance confirmation icon 143.

When the first sub-selection image 102*a* is displayed, the user M can perform an input operation on the input button 205 corresponding to either the first distance confirmation icon 143*a* or the second distance confirmation icon 143*b*. When the user M performs an input operation on the input button 205 corresponding to the first distance confirmation icon 143*a*, the second calculation method is selected. The projector 10 projects the projection image PG including the adjustment image 120 onto the projection surface SC. The projector 10 calculates the size data by the second calculation method. When the user M performs an input operation on the input button 205 corresponding to the second distance confirmation icon 143*b*, the third calculation method is selected. The projector 10 projects the projection image PG including the vertical width adjustment image 130 onto the projection surface SC. The projector 10 calculates the size data by the third calculation method.

The first sub-selection image 102*a* includes, but is not limited to, the second option image 105 and the third option image 107. The first sub-selection image 102*a* may not include the second option image 105 and the third option image 107.

The plurality of calculation methods further include the third calculation method. The controller 60 displays the distance confirmation icon 143 that allows selection of the length of the separation distance between the case 11 and the projection surface SC when not having a measuring instrument is selected, selects the second calculation method when the separation distance being small is selected, selects the third calculation method when the separation distance being large is selected, and displays, on the projection surface SC using the image projection device 30 when the third calculation method is selected, the vertical width adjustment target image 131 whose vertical width VW is changeable and which is smaller than the adjustment target image 121.

The projector 10 can provide a method for calculating size data using the case 11 of the projector 10 or the remote control 200 as the object.

The adjustment image width AW of the adjustment target image 121 is preferably based on the case width PL of the case 11. The vertical width VW of the vertical width adjustment target image 131 is preferably based on the remote control width RL of the remote control 200.

The projector 10 can provide a method for calculating size data using a plurality of objects.

FIG. 20 shows the projection image PG including the sub-selection image 102. FIG. 20 shows the projection image PG including the second sub-selection image 102*b* which is an example of the sub-selection image 102. The second sub-selection image 102*b* is generated by the OSD controller 61 based on the OSD data 71. The projector 10 uses the image projection device 30 to project the projection image PG including the second sub-selection image 102*b* onto the projection surface SC.

The second sub-selection image 102*b* is displayed when the user M performs an input operation on the input button 205 corresponding to the first distance confirmation icon 143*a* in the fourth selection image 101*d* shown in FIG. 18. The second sub-selection image 102*b* is displayed when the user M makes a selection that the separation distance between the projector 10 and the projection surface SC is a close distance. The controller 60 displays the second sub-selection image 102*b* when it is selected that the separation distance between the projector 10 and the projection surface SC is a close distance. The second sub-selection image 102*b* includes the first option image 103, the second option image 105, and the instrument confirmation icon 141.

When the second sub-selection image 102*b* is displayed, the user M can perform an input operation on the input button 205 corresponding to either the first instrument confirmation icon 141*a* or the second instrument confirmation icon 141*b*. When the user M performs an input operation on the input button 205 corresponding to the first instrument confirmation icon 141*a*, the first calculation method is selected. The projector 10 projects the projection image PG including the measurement image 110 onto the projection surface SC. The projector 10 calculates the size data by the first calculation method. When the user M performs an input operation on the input button 205 corresponding to the second instrument confirmation icon 141*b*, the second calculation method is selected. The projector 10 projects the projection image PG including the adjustment image 120 onto the projection surface SC. The projector 10 calculates the size data by the second calculation method.

The second sub-selection image 102*b* includes, but is not limited to, the first option image 103 and the second option image 105. The second sub-selection image 102*b* may not include the first option image 103 and the second option image 105.

Figure 21:
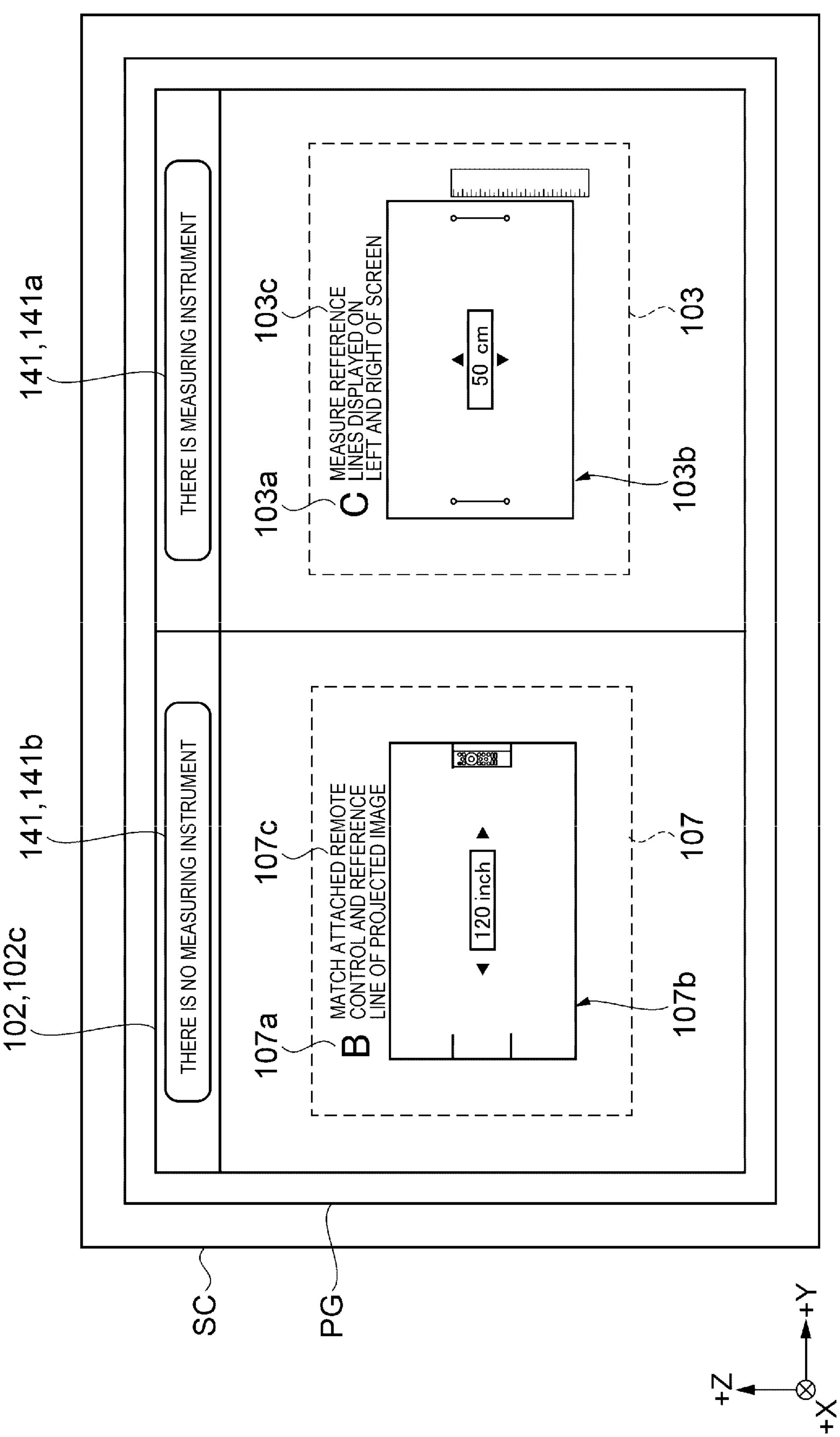
FIG. 21 is a diagram showing the projection image including a sub-selection image.

FIG. 21 shows the projection image PG including the sub-selection image 102. FIG. 21 shows the projection image PG including the third sub-selection image 102*c* which is an example of the sub-selection image 102. The third sub-selection image 102*c* is generated by the OSD controller 61 based on the OSD data 71. The projector 10 uses the image projection device 30 to project the projection image PG including the third sub-selection image 102*c* onto the projection surface SC.

The third sub-selection image 102*c* is displayed when the user M performs an input operation on the input button 205 corresponding to the second distance confirmation icon 143*b* in the fourth selection image 101*d* shown in FIG. 18. The third sub-selection image 102*c* is displayed when the user M makes a selection that the separation distance between the projector 10 and the projection surface SC is a remote distance. The controller 60 displays the third sub-selection image 102*c* when it is selected that the separation distance between the projector 10 and the projection surface SC is a remote distance. The third sub-selection image 102*c* includes the first option image 103, the third option image 107, and the instrument confirmation icon 141.

When the third sub-selection image 102*c* is displayed, the user M can perform an input operation on the input button 205 corresponding to either the first instrument confirmation icon 141*a* or the second instrument confirmation icon 141*b*. When the user M performs an input operation on the input button 205 corresponding to the first instrument confirmation icon 141*a*, the first calculation method is selected. The projector 10 projects the projection image PG including the measurement image 110 onto the projection surface SC. The projector 10 calculates the size data by the first calculation method. When the user M performs an input operation on the input button 205 corresponding to the second instrument confirmation icon 141*b*, the third calculation method is selected. The projector 10 projects the projection image PG including the vertical width adjustment image 130 onto the projection surface SC. The projector 10 calculates the size data by the third calculation method.

The third sub-selection image 102*c* includes, but is not limited to, the first option image 103 and the third option image 107. The third sub-selection image 102*c* may not include the first option image 103 and the third option image 107.

The summary of the present disclosure is appended below.

Appendix 1

A projector according to the present disclosure includes: an optical device configured to emit image light indicating an image; a processing device; and a housing accommodating the optical device and the processing device, in which the processing device displays, on a projection surface using the optical device, a first image for selecting one method of a plurality of methods for determining a size of the image on the projection surface, the plurality of methods including a first method and a second method, displays, on the projection surface using the optical device when the first method is selected, a second image whose length is to be measured, and displays, on the projection surface using the optical device when the second method is selected, a third image whose width is changeable.

The projector can provide the user with a plurality of methods for determining the size of the image, including the first method and the second method. The user can select a method according to the usage condition.

Appendix 2

In the projector according to Appendix 1, the first image includes a plurality of fourth images respectively indicating the plurality of methods.

The user can select a calculation method by selecting the fourth image.

Appendix 3

In the projector according to Appendix 1 or 2, the width of the third image is based on a housing width of the housing or a controller width of a remote controller.

The projector can calculate the size of the image by the user matching or substantially matching the width of the third image with the housing width or the controller width.

Appendix 4

In the projector according to any one of Appendixes 1 to 3, the first image includes a fifth image for selecting whether there is a measuring instrument.

The user can select a method according to presence or absence of the measuring instrument by selecting whether there is a measuring instrument.

Appendix 5

In the projector according to Appendix 4, the processing device selects the first method when it is selected that there is the measuring instrument.

When the user makes a selection that there is a measuring instrument, the projector displays the second image whose length is to be measured, so that the size of the image can be determined by the first method based on the length of the second image.

Appendix 6

In the projector according to Appendix 4 or 5, the processing device selects the second method when it is selected that there is no measuring instrument.

When the user makes a selection that there is no measuring instrument, the projector displays the third image whose width is changeable, so that the size of the image can be determined by the second method based on the width of the third image.

Appendix 7

In the projector according to any one of Appendixes 4 to 6, the plurality of methods further include a third method, and the processing device displays, when it is selected that there is no measuring instrument, a sixth image that allows selection of a length of a distance between the housing and the projection surface, selects the second method when it is selected that the distance is short, selects the third method when it is selected that the distance is long, and displays, on the projection surface using the optical device when the third method is selected, a seventh image whose image width is changeable and which is smaller than the third image.

The projector displays the seventh image whose image width is changeable and which is smaller than the third image when the distance between the housing and the projection surface is long. Therefore, compared with a case where the third image is larger than the seventh image, the user can easily approach the projection surface while holding an object serving as a width reference, for example.

Appendix 8

In the projector according to Appendix 7, the width of the third image is based on a housing width of the housing, and the image width of the seventh image is based on a controller width of a remote controller.

The projector can provide a method based on the housing and the remote controller.

Appendix 9

A method for controlling a projector according to the present disclosure includes: displaying, on a projection surface from the projector, a first image for selecting one method of a plurality of methods for determining a size of an image on the projection surface, the plurality of methods including a first method and a second method; displaying, on the projection surface from the projector when the first method is selected, a second image whose length is to be measured; and displaying, on the projection surface from the projector when the second method is selected, a third image whose width is changeable.

The user can select a calculation method according to the usage condition.

Appendix 10

A non-transitory computer-readable storage medium storing a program according to the present disclosure is provided. The program causes a projector to display, on a projection surface, a first image for selecting one method of a plurality of methods for determining a size of an image on the projection surface, the plurality of methods including a first method and a second method; display, on the projection surface when the first method is selected, a second image whose length is to be measured; and display, on the projection surface when the second method is selected, a third image whose width is changeable.

The projector can provide the user with a plurality of methods including the first method and the second method. The user can select a method according to the usage condition.

What is claimed is:

1. A projector comprising:

an optical device configured to emit image light;

one or more processors; and a housing accommodating the optical device and the one or more processors, wherein the one or more processors are programmed to display, on a projection surface using the optical device, a first image for selecting one method of a plurality of methods for determining a size of an image on the projection surface, the plurality of methods including a first method and a second method, display, on the projection surface using the optical device when the first method is selected, a second image whose length is to be measured, and display, on the projection surface using the optical device when the second method is selected, a third image whose width is changeable, the first image includes a plurality of fourth images respectively indicating the plurality of methods, and includes a fifth image for selecting whether there is a measuring instrument, the plurality of methods further include a third method, and the one or more processors are further programmed to display, when it is selected that there is no measuring instrument, a sixth image that allows selection of a length of a distance between the housing and the projection surface, select the second method when it is selected that the distance is short, select the third method when it is selected that the distance is long, and display, on the projection surface using the optical device when the third method is selected, a seventh image whose image width is changeable, and which is smaller than the third image.

2. The projector according to claim 1, wherein the distance between the reference edges is based on a housing width of the housing or a controller width of a remote controller.

3. The projector according to claim 1, wherein the one or more processors are further programmed to select the first method when it is selected that there is the measuring instrument.

4. The projector according to claim 1, wherein the one or more processors are further programmed to select the second method when it is selected that there is no measuring instrument.

5. The projector according to claim 1, wherein the width of the third image is based on a housing width of the housing, and the image width of the seventh image is based on a controller width of a remote controller.

6. A method for controlling a projector, the method comprising:

displaying, on a projection surface from the projector, a first image for selecting one method of a plurality of methods for determining a size of an image on the projection surface, the plurality of methods including a first method and a second method;

displaying, on the projection surface from the projector when the first method is selected, a second image whose length is to be measured; and displaying, on the projection surface from the projector when the second method is selected, a third image whose width is changeable, wherein the first image includes a plurality of fourth images respectively indicating the plurality of methods, and includes a fifth image for selecting whether there is a measuring instrument, the plurality of methods further include a third method, and the method further includes displaying, when it is selected that there is no measuring instrument, a sixth image that allows selection of a length of a distance between the housing and the projection surface, selecting the second method when it is selected that the distance is short, selecting the third method when it is selected that the distance is long, and displaying, on the projection surface using the optical device when the third method is selected, a seventh image whose image width is changeable and which is smaller than the third image.

7. The method according to claim 6, wherein the distance between the reference edges is based on a housing width of the housing or a controller width of a remote controller.

8. The method according to claim 6, wherein the one or more processors are further programmed to select the first method when it is selected that there is the measuring instrument.

9. The method according to claim 6, wherein the one or more processors are further programmed to select the second method when it is selected that there is no measuring instrument.

10. The method according to claim 6, wherein the width of the third image is based on a housing width of the housing, and the image width of the seventh image is based on a controller width of a remote controller.

11. A non-transitory computer-readable storage medium storing a program, the program causing a projector to display, on a projection surface, a first image for selecting one method of a plurality of methods for determining a size of an image on the projection surface, the plurality of methods including a first method and a second method;

display, on the projection surface when the first method is selected, a second image whose length is to be measured; and display, on the projection surface when the second method is selected, a third image whose width is changeable, wherein the first image includes a plurality of fourth images respectively indicating the plurality of methods, and includes a fifth image for selecting whether there is a measuring instrument, the plurality of methods further include a third method, and the program further causes the projector to display, when it is selected that there is no measuring instrument, a sixth image that allows selection of a length of a distance between the housing and the projection surface, select the second method when it is selected that the distance is short, select the third method when it is selected that the distance is long, and display, on the projection surface using the optical device when the third method is selected, a seventh image whose image width is changeable and which is smaller than the third image.

12. The non-transitory computer-readable storage medium according to claim 11, wherein the distance between the reference edges is based on a housing width of the housing or a controller width of a remote controller.

13. The non-transitory computer-readable storage medium according to claim 11, wherein the one or more processors are further programmed to select the first method when it is selected that there is the measuring instrument.

14. The non-transitory computer-readable storage medium according to claim 11, wherein the one or more processors are further programmed to select the second method when it is selected that there is no measuring instrument.

15. The non-transitory computer-readable storage medium according to claim 11, wherein the width of the third image is based on a housing width of the housing, and the image width of the seventh image is based on a controller width of a remote controller.

* * * * *